Dec. 27, 1960    L. R. HARPER    2,966,304
ELECTRONIC COMPUTER
Filed Aug. 23, 1955    12 Sheets-Sheet 1

INVENTOR.
LEONARD R. HARPER
BY
ATTORNEY

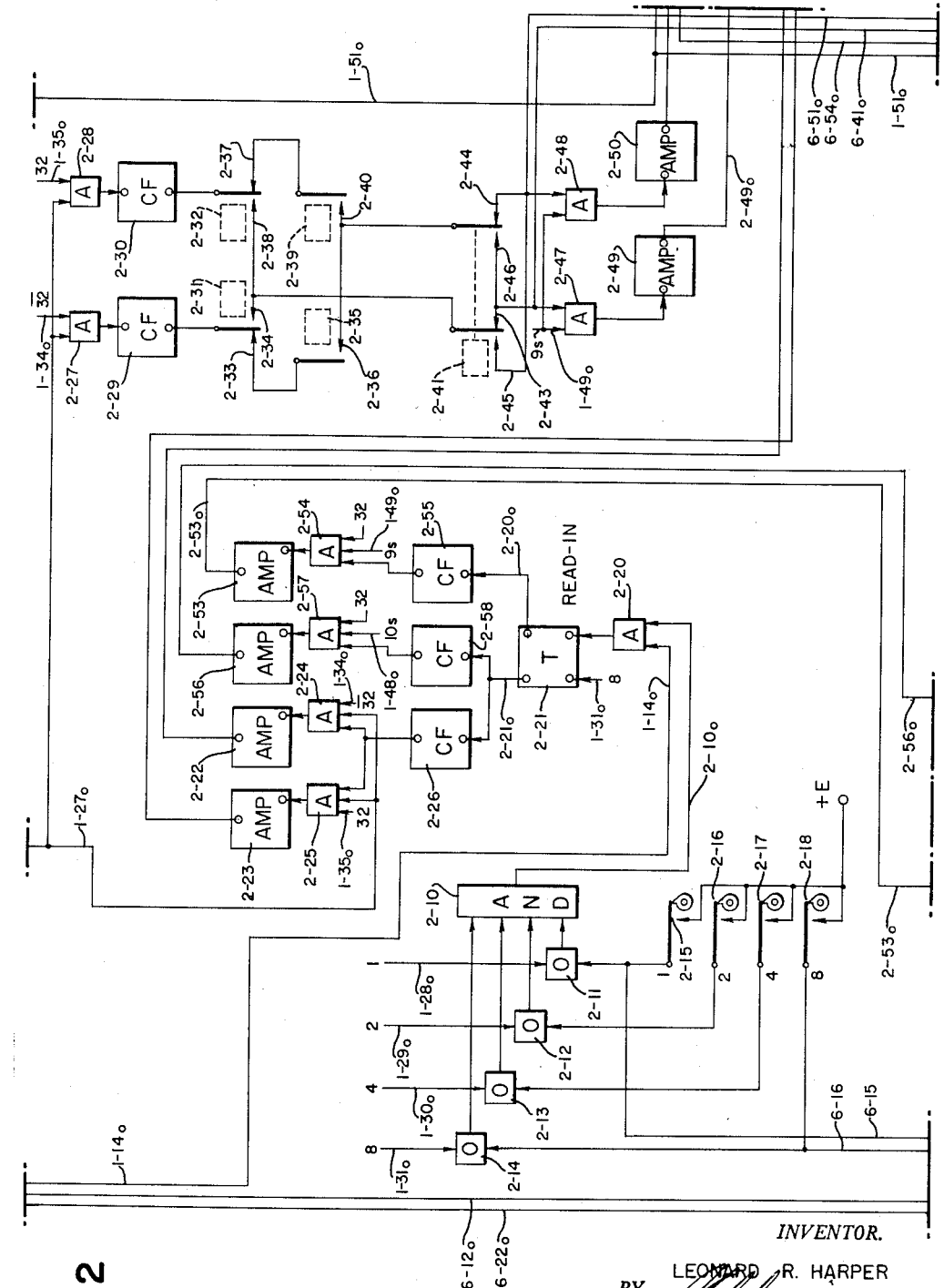
FIG. 2
INVENTOR.
LEONARD R. HARPER
BY
ATTORNEY

Dec. 27, 1960  L. R. HARPER  2,966,304
ELECTRONIC COMPUTER
Filed Aug. 23, 1955  12 Sheets-Sheet 3

INVENTOR.
LEONARD R. HARPER
BY
ATTORNEY

Dec. 27, 1960 L. R. HARPER 2,966,304
ELECTRONIC COMPUTER
Filed Aug. 23, 1955 12 Sheets-Sheet 4

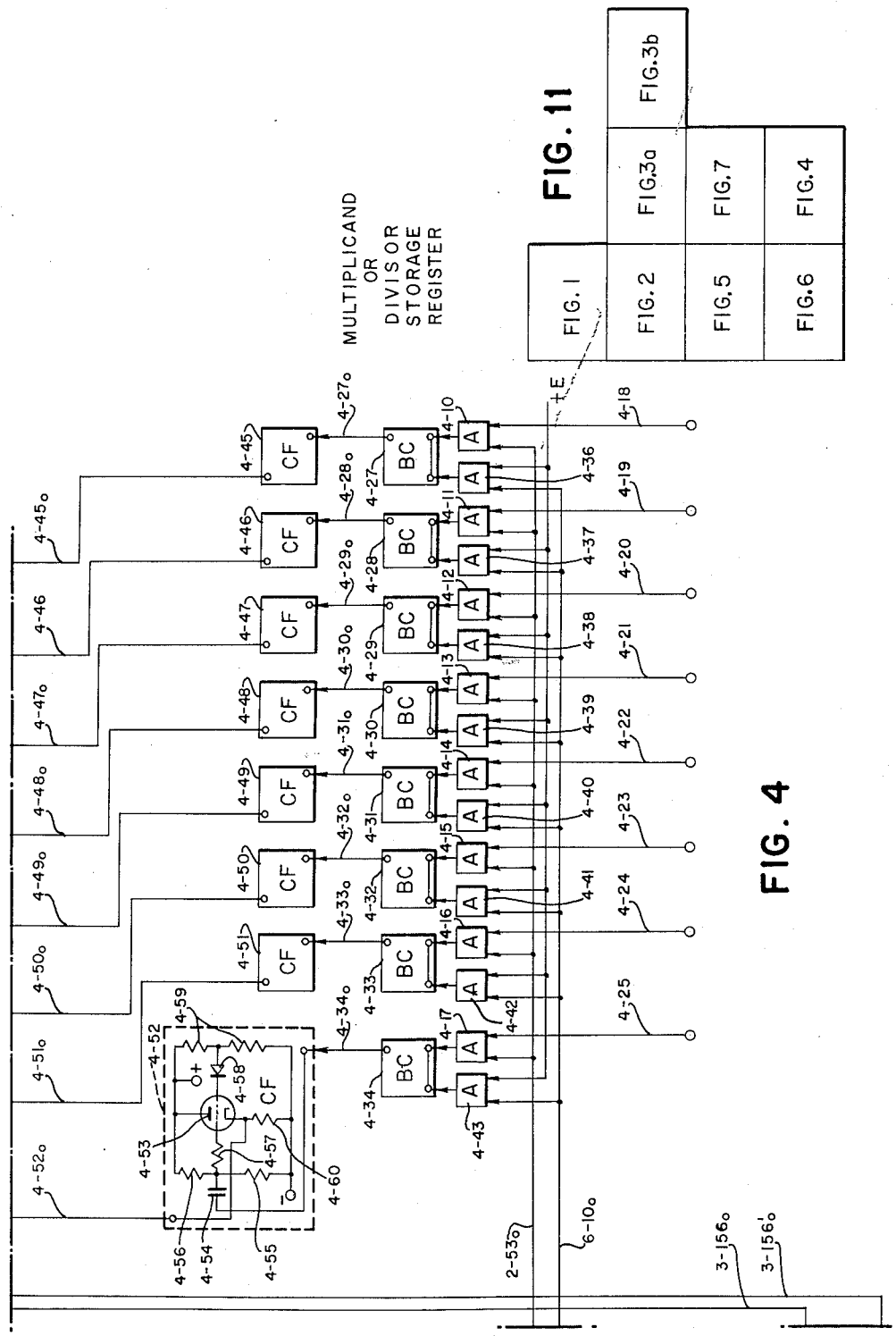

Dec. 27, 1960     L. R. HARPER     2,966,304
ELECTRONIC COMPUTER
Filed Aug. 23, 1955     12 Sheets-Sheet 8
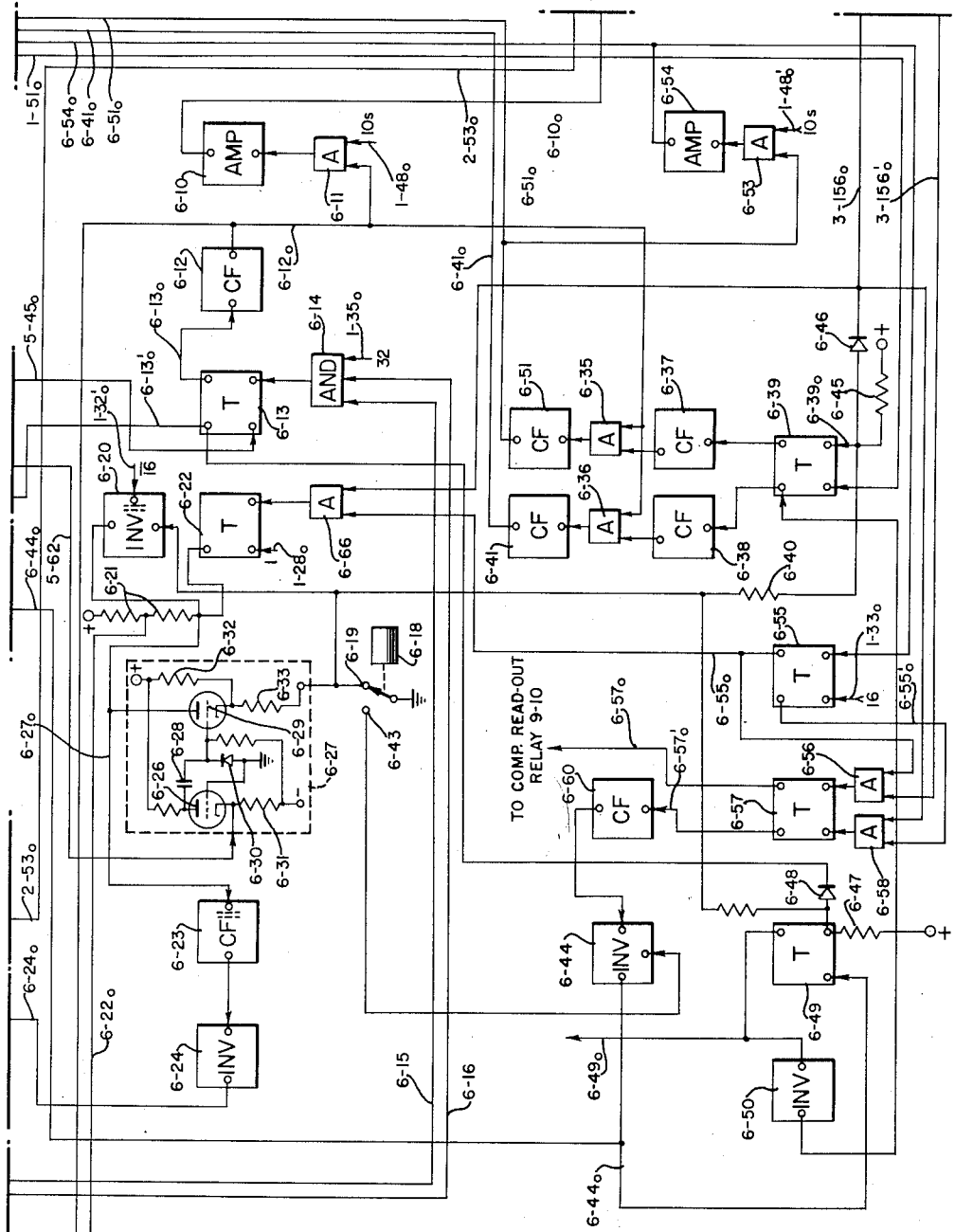
FIG. 6
INVENTOR.
LEONARD R. HARPER
BY
ATTORNEY

INVENTOR.
LEONARD R. HARPER
ATTORNEY

United States Patent Office 2,966,304
Patented Dec. 27, 1960

2,966,304

ELECTRONIC COMPUTER

Leonard Roy Harper, Poughkeepsie, N.Y., assignor to International Business Machines Corporation, New York, N.Y., a corporation of New York Filed Aug. 23, 1955, Ser. No. 530,091

10 Claims. (Cl. 235—160)

The present invention relates to electronic computers and, more particularly, to computers having particular utility for use with many forms of business machines to process data information supplied in the form of punched data cards.

Many forms of present day business machines process data information supplied to the machine from punched data cards. Conventional data cards employ several hundred data index points arranged in columns and rows of columns, and the cards are moved in succession past a reading station of the business machine to read into the machine the data recorded on the card. The business machines which read the cards are usually of the type which feed the card, index point by index point, past the reading station. The columns of index points are usually divided into "fields" of data information, each field relating to a specific type of information. Each field is selected to have a digit length sufficient to record data information of a particular nature, and the business machine distinguishes and processes the information of each field as an entity.

The broad field of application of business machines is in performing tabulating functions. It would be desirable to have available a small and relatively inexpensive yet versatile computer which could be added in simple manner and at moderate cost to such machines to extend their utility to accounting functions such as payroll accounting, billing, and similar operations. A computer of this type should be of simple arrangement and of unitary structure requiring little or no change in the business machine structure when added to the latter. Further, the addition of the computer should result in substantially enhanced flexibility and utility of the business machine, and should permit simple forms of program control by punched holes in the cards. The computer also should operate at relatively high calculation rates to enable it to perform numerous program calculation operations within the limited time available in each card cycle.

It is an object of the present invention to provide a new and improved electronic computer having a relatively simple, compact and inexpensive construction yet one of versatile operation enabling substantially enhanced utility and scope of functions of many present day business machines.

It is a further object of the invention to provide a novel electronic computer having highly simplified modes of operation and greatly minimized number of components to enable it to be easily and readily installed and serviced by relatively inexperienced field service personnel.

It is an additional object of the invention to provide an improved electronic computer in which data information is read into the computer from data cards at electronic read-in rates, thereby gaining maximum time within which to perform numerous computations.

It is a further object of the invention to provide an electronic computer in which certain computation programming is accomplished in simple manner by card punching so that limited changes of programming may be effected from card to card as desired, and one in which the results of program calculations on the data information of one card be carried over to be used with or accumulated with data information from one or more succeeding cards.

It is yet another object of the invention to provide an electronic computer which employs a novel data read-in system by which each data bit is directly evaluated during card read-in to derive an electrical signal having one weighted value representing the data bit in true form or a second value representing the data bit in complemented form, the evaluation being provided in decimal notation in either case and being thus suitable for use with binary operating devices.

It is an additional object of the invention to provide a novel electronic computer in which the interval required for a multiplication operation is minimized by immediately sensing and passing over, and thus devoting no significant calculation interval to, all zeros appearing in any digit position of the multiplier.

In accordance with one form of the invention, an electronic computer includes means for receiving successively presented patterns of binary form data information representing a plural-digit quantity, the information bits of any given pattern being presented simultaneously and identifying equi-valued digits of such quantity, means responsive to the time of presentation of each such pattern for developing a control effect identifying the value of the information bits thereof, and means for utilizing the control effects developed for a plurality of such patterns for evaluating the quantity.

In a particular form of the invention, the computer includes data information storage means and means for furnishing a comparative evaluation standard, and the evaluation of the quantity occurs in response to the evaluation standard and upon translation of the data information to storage in the storage means. The evaluation standard may be furnished in true form and in complementary form, so that the evaluation of the quantity in one such form is related to a selectable one of the standards, and one quantity evaluated in one such form and translated to storage in the storage means may be combined in storage with a second quantity evaluated in a form which may be the same as or different from the form of the first quantity.

Other objects and advantages of the invention will appear as the detailed description proceeds in the light of the drawings forming a part of this application and in which:

Fig. 2 represents schematically a data read-in input matrix and an add-subtract control system of the computer;

Fig. 4 is a schematic circuit diagram of a multiplicand or divisor register employed in the computer;

Fig. 6 represents schematically a calculation control system which provides general overall control of the computer during calculation intervals;

Fig. 11 indicates the manner in which Figs. 1–7 should be considered together as a unitary arrangement.

*General organization and operation*

The electronic computer of the present invention provides an arrangement suitable for use with many forms of present day business machines operating in conjunction with punched data cards. The computer functions to add ("crossfoot") or subtract two sixteen-digit fields or four eight-digit fields. It operates to multiply two eight-digit fields, to produce a sixteen-digit product, which is then automatically added to the result of the addition or subtraction previously mentioned. By using a unit multiplier, an eight-digit field may be added or subtracted to the result of the initial addition or subtraction. Alternatively, the computer may be operated to divide a sixteen-digit dividend by an eight-digit divisor to result in an eight-digit quotient and an eight-digit remainder.

The addition of the two sixteen-digit fields or four eight-digit fields is accomplished directly on read-in from the data card by alternate read-in of two sixteen-digit fields, or alternate read-in of two pairs of eight-digit fields, during one brush scan of the data card. At the same time, a multiplicand and multiplier or a divisor may be simultaneously read in with the several fields which are to be directly added or subtracted. The addition or subtraction process occurs simultaneously with read-in, and this is followed during a subsequent calculation interval by the multiplication or division operation.

The computer employs three storage registers. One is a sixteen-digit register hereinafter designated a "product accumulator," and in which simple additions and subtractions occurs directly. Two are eight-digit registers in which a multiplicand and multiplier are individually stored, or in which a divisor is stored in one and the quotient is developed in the other. The numerical value of each data bit is directly evaluated at read-in, and an electrical signal of pulse wave form is developed to represent in decimal notation and by number of pulses the value of such bit. This effectively converts the data information from card code form to decimal notation form and permits simplification of computer construction by the use of the binary form of register.

A multiplier stored in the multiplier register is destroyed on read-out during multiplication, but it is possible where desired to preserve the results of computation stored in the product accumulator or to preserve the multiplicand stored in its register through successive card cycles. In this, the product accumulator can be selectively reset each card cycle in individual eight-digit "left hand" and "right hand" sections.

Figure 3C:
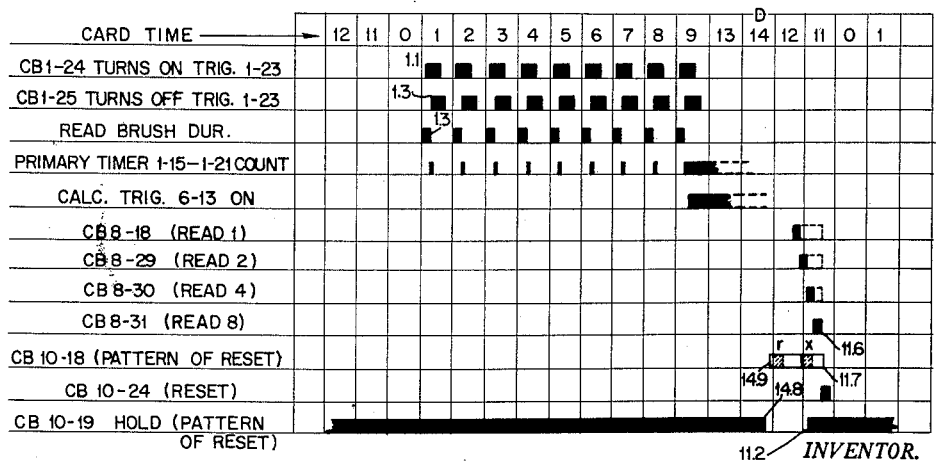
Fig. 3c represents graphically certain timing relationships involved in the computer.

Computation is under control of an electrical generator which generates a timing signal of pulse wave form having a 25 kilocycle per second pulse periodicity. This signal times all read-in of data information and computation operations. With the well-known type of cards used in the business machines art, each card has twelve index points. In feeding the cards index point by index point, there is usually a space equal to two index points between the card edges. Figure 3c shows a breakdown of card time according to index point, the 13 and 14 index points being between cards. The 12 or 11 index points may normally be used for such information as signs. From Fig. 3c it is seen that each of the index times may be divided into ten parts for convenience so that 3.1 index point time represents 0.1 of an index time after 3 index time. A primary counter operating under control of the timing signal establishes four read-in cycles for each of nine digit values of the data information. In the first and third cycles, two fields of the data card are read in for addition or subtraction in the product accumulator, and in the second and fourth cycles any carries resulting from this operation are added back into the result. Also during the first and third cycle, a multiplier and multiplicand or a divisor are simultaneously read in to individual storage registers. Each multiplication or division computation occurs in a calculate interval following the last or fourth cycle of read-in of the last row of the card. In multiplication, the product is added directly to the result of the read-in add or subtract computation in the product accumulator. The initial read-in addition or subtraction computation stored in the product accumulator is the dividend upon which a divisor operates to develop a quotient in the same register as would be used to store a multiplier in a multiplication operation. In the multiplication operation, any zeros wherever found in any digit position of the multiplier are sensed and immediately passed over as multiplication proceeds thus to minimize the computation interval required for the multiplication operation.

The results of computation are in the 1—2—4—8 binary form and are translated to relay storage until punch or print time when the results are read out of the relay storage system in decimal form. The sign control of the computer is such that it designates whether the results of computation are in true form or complementary form, and so controls the storage relay system on read out as to provide complement correction.

*Electrical timing system*

Figure 1:
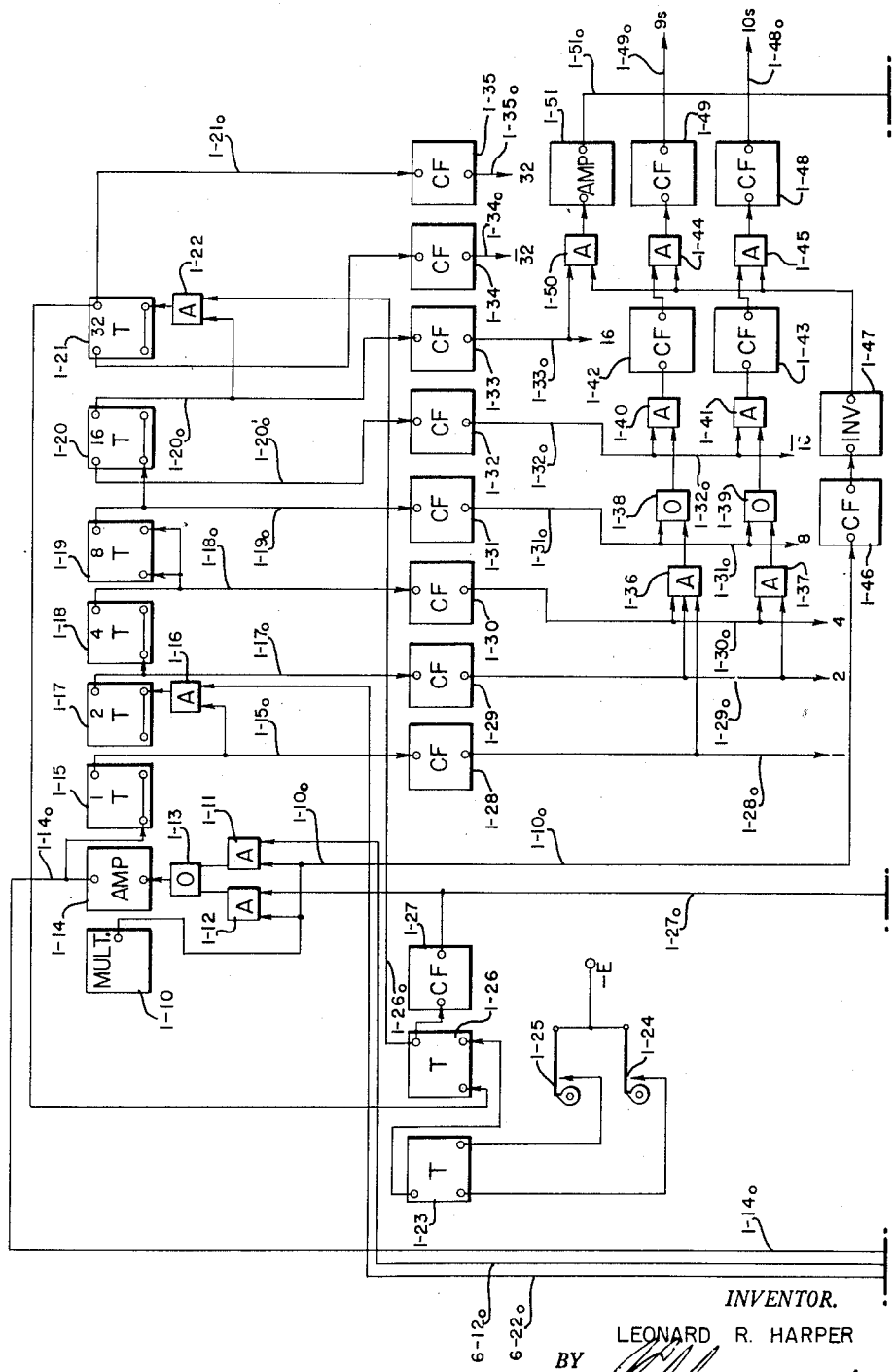
Fig. 1 represents schematically an electronic timing system used to control the operation of a computer embodying the present invention.

Refer now more particularly to Fig. 1, which represents schematically an electronic timing system used to control the operation of the computer. The system employs a multivibrator 1—10 of the free running type which generates an electrical signal of pulse wave form having a pulse periodicity of approximately 25 kilocycles per second. The pulses of this signal are hereinafter referred to as clock pulses and are applied to each of two AND gates 1–11 and 1–12 which are selectively conditioned, in a manner later to be described, to translate the clock pulses through an OR unit 1–13 and an amplifier 1–14 to a binary 1 counter unit 1–15. The potential developed in the output circuit 1–15$o$ of this counter unit is applied through an AND gate 1–16, which is conditioned to open up in a manner and at a time later to be explained, to control the operation of a binary 2 counter unit 1–17. The counter units 1–15 and 1–17 form two units of a primary timer comprised additionally by binary 4, 8, 16 and 32 counter units 1–18, 1–19, 1–20, and 1–21. The operation of this counter arrangement is conventional, the counter units 1–15 through 1–20 performing a total count of 32 while the counter unit 1–21 completes the count to a total count of 64. In this, the potential developed in the output circuit 1–20$o$ of the counter unit 1–20 is applied through an AND gate 1–22 (which is conditioned to open up in a manner later to be explained) to control the operation of the counter unit 1–21.

A read-in control multivibrator or trigger 1–23 is normally reset off at the outset of the computer operation, and is turned on by a circuit breaker or CB 1–24 which closes its contacts at card-row times 1.1, 2.1, 3.1 etc. through 9.1 of each card cycle. The trigger 1–23 is subsequently turned off by a circuit breaker or CB 1–25 which closes its contacts at card-row times 1.3, 2.3, 3.3, etc. through 9.3 of each card cycle. The trigger 1–23 upon turning on turns on with it a trigger 1–26 which is initially reset off, and the potential developed in the output circuits 1–26$o$ of this trigger is applied both through a cathode follower 1–27 to open the AND gate 1–12 and directly to open the AND gate 1–22. The AND gate 1–12 thereupon translates the clock pulses of the multivibrator 1–10 through the amplifier 1–14 to the primary counter. Assuming the AND gate 1–16 to be open at this time, the primary counter operates to count the next 64 clock pulses at which the counter unit 1–21 turns off or "carries out" to turn off with it the trigger 1–26. When this occurs, the AND gates 1–12 and 1–22 are no longer opened by the trigger 1–26 and the operation of the primary counter ceases.

The potentials developed in the output circuits of the primary counter units 1–15, 1–17, 1–18 and 1–19 are translated through individual ones of a plurality of respective cathode followers 1–28–1–31. In smiliar manner, the output circuits 1–20o' and 1–20o of the counter unit 1–20 are coupled to respective cathode followers 1–32 and 1–33 while the output circuits 1–21o' and 1–21o of the counter unit 1–21 are coupled to respective cathode followers 1–34 and 1–35.

A potential of pulse wave form having nine grouped pulses and one having ten grouped pulses are generated by the Fig. 1 arrangement for certain control purposes hereinafter mentioned. To this end, the output potential of the cathode follower 1–28 is applied to an AND gate 1–36, while the output potentials of the cathode followers 1–29 and 1–30 are both applied to the AND gate 1–36 and also to an AND gate 1–37. The outputs of the gate 1–36 and 1–37 are applied to respective OR units 1–38 and 1–39 to which is also applied the output potential of the cathode follower 1–31. The output potentials of these OR units are applied to respective AND gates 1–40 and 1–41 to which are also applied the output potential of a cathode follower 1–32 coupled to the output circuit 1–20o' of the counter unit 1–20. The outputs of the AND gates 1–40 and 1–41 are applied through respective cathode followers 1–42 and 1–43 to respective AND gates 1–44 and 1–45 to which are also applied clock pulses translated from the output circuit 1–10o of the multivibrator 1–10 through a cathode follower 1–46 and an inverter 1–47.

The operation of the 9's and 10's pulse generators just described will now be considered. After the primary counter has counted six clock pulses, only the counter units 1–17 and 1–18 are turned on so that the elevated potential in the output circuits 1–17o and 1–18o of these units is translated through the AND gate 1–37, the OR unit 1–39, and the AND gate 1–41 (the counter unit 1–20 being off to develop an elevated potential in its output circuit 1–20o') and the cathode follower 1–43 to open the AND gate 1–45. The latter thereupon begins to translate clock pulses to a cathode follower 1–48. After ten clock pulses have been translated by the gate 1–45, during which time the counter 1–19 turned on to maintain the AND gate 1–41 open when the counter units 1–17 and 1–18 turned off during the counter operation, all of the counter units 1–17, 1–18, and 1–19 become turned off and thus shut down the AND gates 1–41 and 1–45. This arrangement of units is accordingly one which develops in the output circuit 1–48o of the cathode follower 1–48 a potential having a total of ten grouped pulses. It can similarly be shown that by operation of the AND gate 1–36, the OR unit 1–38, and the AND gate 1–40, the AND gate 1–44 applies to a cathode follower 1–49 nine clock pulses of which the first occurs at the time of the second clock pulse from the cathode follower 1–46. Thus the cathode follower 1–49 develops in its output circuit 1–49o a potential having nine grouped pulses starting one clock interval after the first pulse in the cathode follower output circuit 1–46o but terminating at the same time as the latter.

The output circuit 1–20o of the counter unit 1–20 is coupled through the cathode follower 1–33 to an AND gate 1–50 to which is also supplied the clock pulses translated by the inverter 1–47, and accordingly during the entire on period of the counter unit 1–20 (second and fourth counter cycles) clock pulses are translated by the gate 1–50 to an amplifier 1–51 and appear in the output circuit 1–51o of this unit. These translated clock pulses are used, as hereinafter explained, to reset the carry store triggers employed in the product accumulator.

*Read-in input matrix and add-subtract control system*

The read-in input matrix operates in conjunction with the Fig. 1 timing system to evaluate each data bit at read-in. The system used in storing the data information in the data cards is one such that the data bits of each data field identify specific information and to this end occupy discrete positions in the columns of index points of the field. The value of each data bit is recorded by the row in which the data bit is punched in its columnar position. The data bit column positioning is identified by read-in brushes of the associated business machines, but the value of each data bit is determined by the read-in input matrix operating in conjunction with the Fig. 1 timing system.

Fig. 2 represents schematically the input matrix together with the add-subtract control system, and should be considered with Fig. 1 in the arrangement shown in Fig. 11.

The input matrix includes an AND gate 2–10 having four input circuits comprised by the output circuits of four OR units 2–11, 2–12, 2–13, and 2–14. One input circuit of these OR units is comprised by the respective output circuits 1–28o, 1–29o, 1–30o, and 1–31o of the binary 1—2—4—8 units of the primary counter. The OR units 2–11–2–14 include a second input circuit comprised by an individual one of respective circuit breakers or CBs 2–15–2–18 which are included as components of the associated business machine and operate to identify the particular card row which is passing at any given time under the read-in brushes. This identification is in the 1—2—4—8 binary form wherein closure of CB 2–15 contacts indicate row 1, closure of CB 2–16 contacts indicate row 2, closure of both CB 2–15 and 2–16 contacts indicate row 3, etc. until closure of CB 2–15 and 2–18 contacts for indication of row 9.

The AND gate 2–10 operates in conventional manner to develop a potential in its output circuit 2–10o only when its four input circuits are simultaneously energized. Thus when the CB 2–15 contacts close to indicate read-in of row 1 of the data card, the AND gate 2–10 is able to open only when the primary counter units 1–17, 1–18, and 1–19 turn on to apply energizing potentials to the three other input circuits of the AND gate 2–10. This occurs, of course, after the primary counter has counted fourteen clock pulses which may be considered as the fifteenth unit of primary time since the count started with all of the counter units turned off.

Figure 2A:
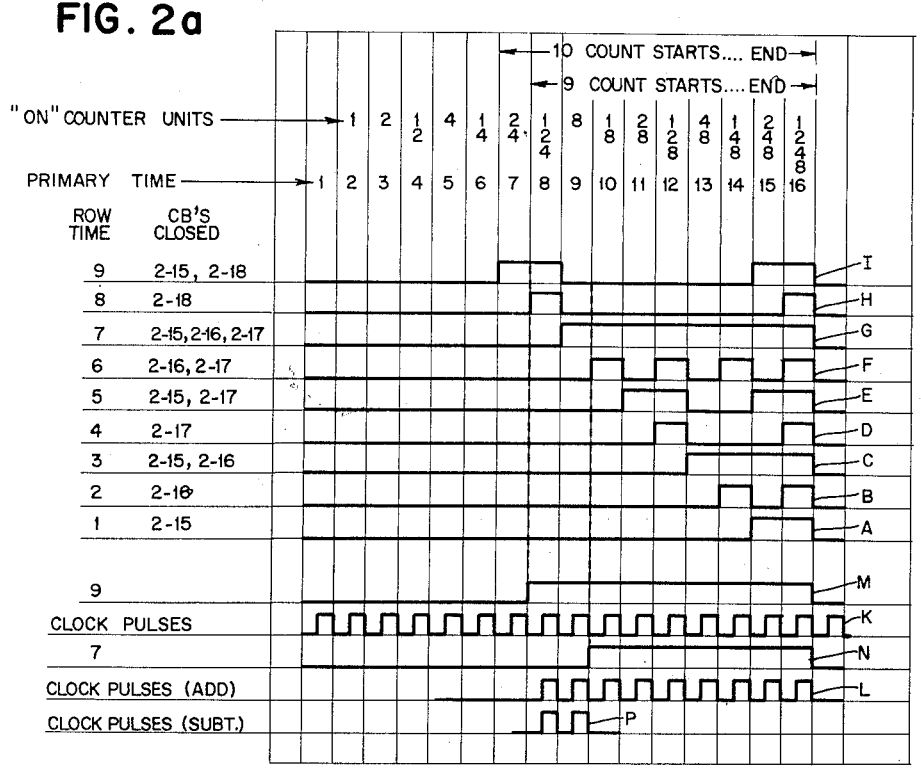
Fig. 2a represents graphically certain operating characteristics of the read-in input matrix and is used as an aid in explaining the operation of the matrix and the add-subtract control system.

This timing relationship is shown more clearly in Fig. 2a wherein curve A represents the output potential of the gate 2–10 during closure of the CB 2–15 contacts. In this figure, the axis of ordinates represents primary times 1–16 and the particular counter units which are turned on during each interval of the primary time. It will be noted from Fig. 2a, and as indicated by curve A, that the gate 2–10 develops an output potential during primary times 15 and 16 when binary 2—4—8 counter units are on during both periods. Curve B represents the output of the gate 2–10 when the CB 2–16 contacts are closed, and curves C–I represent the corresponding outputs at succeeding times when the CBs close individually or in combination at successive read-in row times.

The input matrix is used to control the interpretation of the value of each data bit. To this end, the output potential of the gate 2–10 is applied to an AND gate 2–20 to which are also applied clock pulses translated by the amplifier 1–14 of Fig. 1. It has been earlier explained that clock pulses are developed in the output circuit 1–14o of the amplifier 1–14 during card read-in time when the CBs 1–24 and 1–25 cause the trigger 1–26 to turn on and thereby open up the AND gate 1–12 to the amplifier 1–14.

The trailing edge of the first clock pulse translated by the AND gate 2–20 turns on a read in trigger 2–21. Curve K of Fig. 2a represents the clock pulses generated by the multivibrator 1–10. It will be apparent from curve K that the first clock pulse translated by the AND gate 2–20 after the CB 2–15 contacts are closed (read-in of card row 1) and the AND gate 2–10 opens it (curve A of Fig. 2) is that occurring during primary time 15. Accordingly, the trigger 2–21 turns on at the trailing edge of this pulse or at the beginning of sixteen primary time. To appreciate the importance of this, it may be noted that only one 9's pulse is developed in the output circuits of the cathode follower 1–48 after the trigger 2–21 turns on or conversely that 8 pulses have been developed in the output circuit of the cathode follower 1–49 prior to turn on of the trigger 2–21. It will later be shown that this single pulse of unit 1–48 or the multiple pulses of unit 1–49 is or are used during read-in to evaluate in true or complemented form all data bits appearing in the first row of index points of the data card. By the same reasoning, it will be apparent that when the contacts of CB's 2–15 and 2–18 close to identify read-in of row 9 of the data card, curve I of Fig. 2a shows that the AND gate 2–10 develops an output potential during primary times seven and eight and that the trigger 2–21 accordingly turns on at the beginning of primary time eight. This is sufficiently early that nine clock pulses are translated by the cathode follower 1–48 after turn on of the trigger 2–21, or no clock pulses are translated by the cathode follower 1–49 before the trigger 2–21 turns on, and as before these pulses may be used to evaluate in true or complement form any data bit read at this time as having a value of nine. Thus the input matrix and the Fig. 1 timing system evaluate each data bit read from the data cards. The manner in which this evaluation is used will now be considered with respect to the addition and subtraction computations performed by the computer.

*Add-subtract operation*

For purposes of addition and subtraction, the computer includes a sixteen-digit counter or register, which may conveniently be called a product accumulator, into which data information is entered from either two sixteen-digit fields of the data card or four eight-digit fields. It has been indicated in the discussion of the Fig. 2 arrangement that each data digit is evaluated to develop and electrical signal of pulse wave form having pulses corresponding in number to the digit value. This pulse signal is used to enter the value of the digit into the product accumulator. For addition of corresponding digit orders in two card fields, the digits of given order are inserted successively into the product accumulator so that the value of one adds directly to the other. In accomplishing this, the first digit is entered during primary times 8 through 16. Each digit unit of the product accumulator includes a carry-out trigger, and all these triggers are repeatedly simultaneously pulsed during primary times 17 through 32 to enter any carry into the next higher order digit position of the product accumulator. This carry operation has no significance if the first digits are entered in true form. The digits of the second card field are entered during primary times 33 through 48, and the carry store triggers are again simultaneously and repeatedly pulsed during primary times 49 through 64 to insert any carry into the accumulator.

For convenience, the four periods of primary time last mentioned will hereinafter be referred to as the first, second, third, and fourth cycles of the primary timer. The subtract process is similar to that described with the exception that one field of data information is stored in the product accumulator in true form and the other in complementary form. The manner in which an electrical signal is developed with pulses corresponding in number to the value of the complement of a given digit was indicated in connection with Figs. 2 and 2a and will be explained in more detail below. As is well known, the successive insertion into a register of numbers in true and complement form has the result that the number in complement form subtracts from the value of the number entered in true form.

Figure 3A:
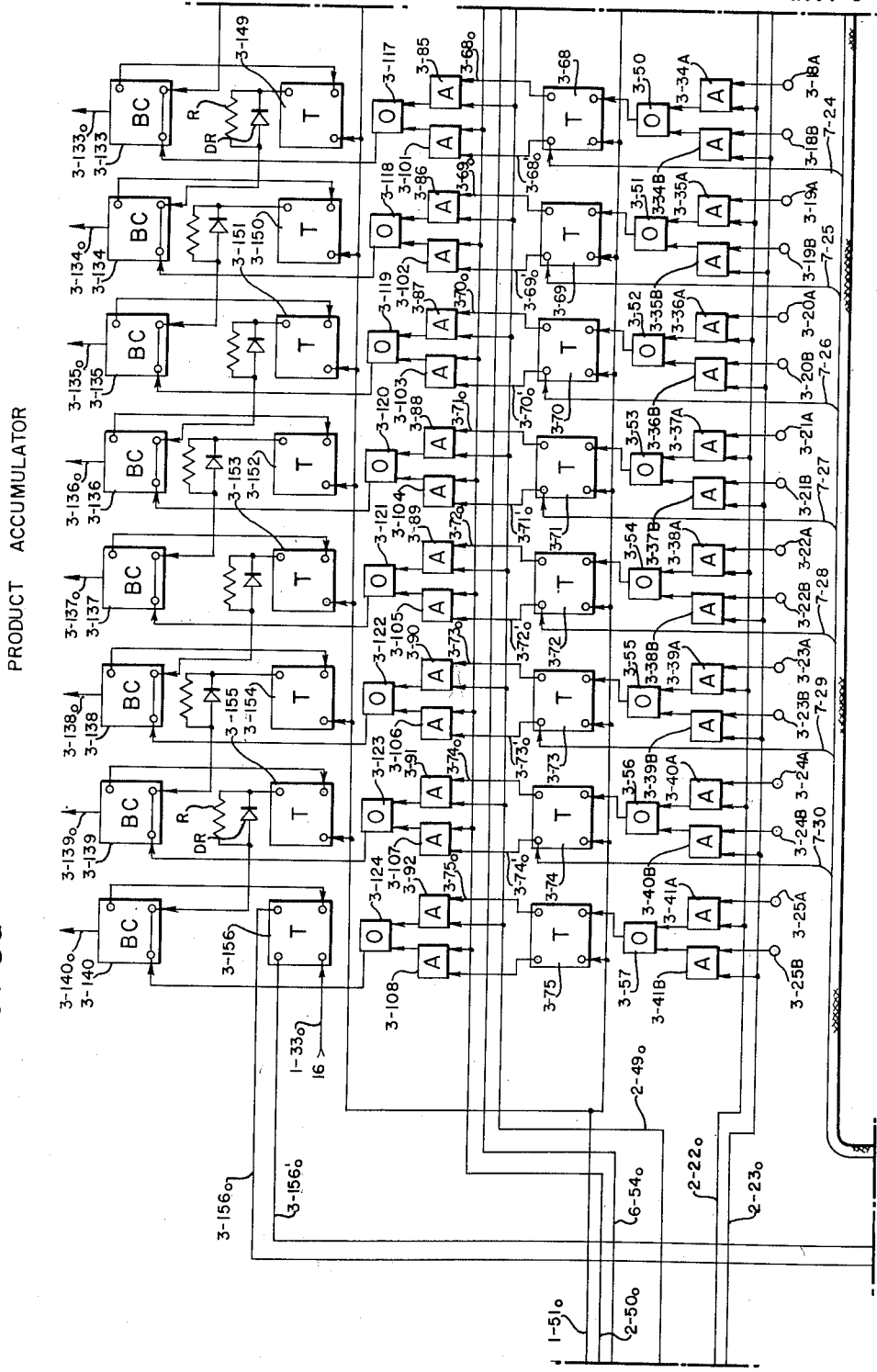
Figs. 3a and 3b represent schematically a product accumulator used in the computer.
Figure 3B:
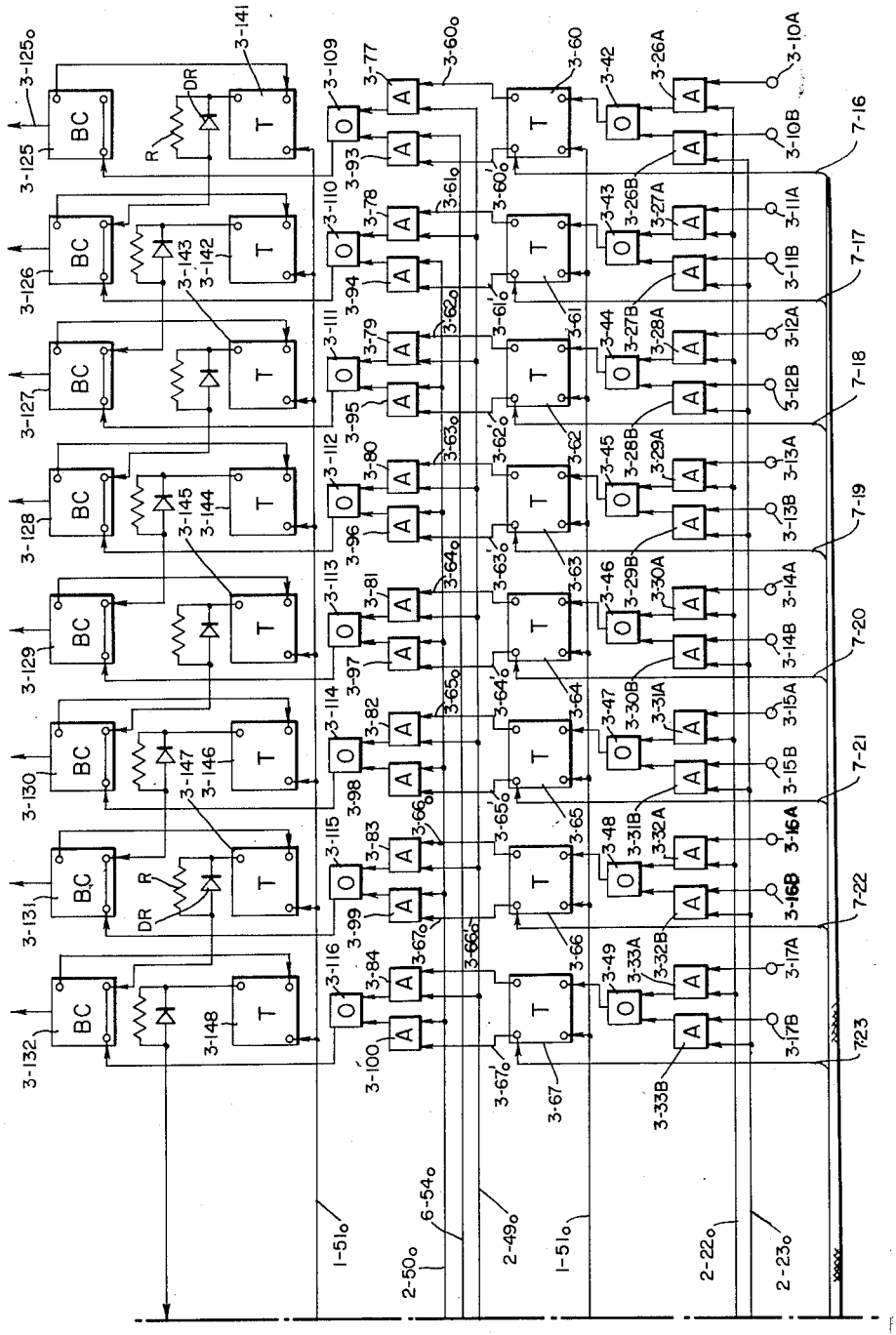

Figs. 3a and 3b, which should be considered together as shown in Fig. 3 represent schematically the arrangement of the product accumulator and associated carry store triggers. Figs. 3a and 3b should be arranged with Figs. 1 and 2 as indicated in Fig. 11. Data store triggers precede the accumulator and cooperate in evaluating each data digit. The data information is read in in conventional manner from the read-in brushes of the associated business machine.

The read-in brushes associated with one card field are connected through input circuits 3–10A–3–25A to respective AND gates 3–26A–3–41A. The read-in brushes of the second card field are connected through input circuits 3–10B–3–25B to respective AND gates 3–26B–3–41B. The gates 3–26A–3–41A are first opened, to store the "A" field of data information, by a potential developed in an output circuit 2–22o of an amplifier 2–22 of the Fig. 2 control system. This amplifier translates the potential developed in the output circuit of an AND gate 2–24 having three input circuits. One of these is comprised by the output circuit 1–27o of the cathode follower 1–27 (Fig. 1) which develops a potential while the trigger 1–26 is on during card data read-in primary times 1–64. A second input circuit of the AND gate 2–24 is comprised by the output circuit of a cathode follower 2–26 which translates the elevated potential developed in the output circuit 2–21o′ of the read-in trigger 2–21 during the period when the latter is turned off. The third input circuit of the AND gate 2–24 is comprised by the output circuit 1–34o of the cathode follower 1–34 which translates an elevated potential during periods when the binary 32 unit 1–21 of the primary counter is turned off.

In similar fashion, the "B" field of data information is later entered when the AND gates 3–26B–3–41B are opened up by the potential developed in the output circuit 2–23o of an amplifier 2–23. The latter also includes an input AND gate 2–25 having two input circuits comprised by the output circuits of the cathode followers 1–27 and 2–26 and having a third input circuit comprised by the output circuit 1–35o of the cathode follower 1–35 which develops an elevated potential during the on periods of the binary 32 unit 1–21.

It will be apparent from this arrangement that the AND gate 2–24 is opened during primary times 1–16 (first cycle) to store the "A" field of data information through AND gates 3–26A–3–41A, whereas the AND gate 2–25 is open during primary times 33–49 (third cycle) to store the "B" field of data information through AND gates 3–26B–3–41B.

The group of AND gates 3–26A–3–41A and the group 3–26B–3–41B have output circuits which comprise input circuits of a plurality of respective OR units 3–42–3–57. Potentials developed in the output circuits of the latter units are used to turn on a respective data store trigger 3–60–3–75. In this, the read-in trigger 2–21 is turned on during the first and third read-in cycles by the input matrix as earlier described and is turned off when the binary 8 primary counter unit 1–19 turns off at the end of the corresponding read-in cycle. The cathode follower 2–26 includes a differentiating input circuit, comprised by a series condenser and shunt resistor, which causes the cathode follower to develop a negative "spike" or short-duration potential pulse each time the trigger 2–21 turns on. This negative potential pulse is inverted by the amplifiers 2–22 and 2–23 and it is this potential pulse which opens up the AND gates 3–26A–3–41A and 3–26B–3–41B to cause the triggers 3–60–3–75 to turn on and store data bit information appearing at the input circuits 3–10A–3–25A and 3–10B–3–25B. This read in to the data store triggers occurs during each of row times 1 through 9 of the data card when read at the reading station of the associated business machine. Fig. 3c is a timing chart graphically representing this timing relationship more clearly, and indicates the periods when the CB 1–24 and 1–25 contacts close as well as the brush contact periods at the reading station of the associated business machine and the relative duration of four cycles of the primary timer.

In order to evaluate each digit of the A and B fields of data information and store it in the product accumulator, the output potential of the cathode follower 1–27 is applied to two AND gates 2–27 and 2–28. The AND gate 2–27 is opened up by the potential developed in the output circuit 1–34o of the cathode follower 1–34 when the binary 32 counter unit 1–21 is off, while the AND gate 2–28 is opened up by the output potential of the cathode follower 1–35 when the binary 32 counter unit 1–21 is on. These gates when open translate a potential through respective cathode followers 2–29 and 2–30 to the movable contacts of respective relays 2–31 and 2–32. These relays are actuated by program control instructions punched into program-control rows of index points of the data card. Relay 2–31 program controls the addition or subtraction of A data information, and relay 2–32 program controls in like manner B data information. The movable contact of relay 2–31 normally engages a fixed contact 2–33 but may be actuated to engage a contact 2–34 when it is desired to enter A data information into the product register in true form. If A data information is to be entered into the product register in complement form, a second relay 2–35 is actuated (again by punched data card program control) to engage a fixed contact 2–36 and in this event the relay 2–31 is not actuated and engages its fixed contact 2–33. The relay 2–32 similarly includes fixed contacts 2–37 and 2–38, and a complement relay 2–39 is actuated to engage a fixed contact 2–40 whenever the program control effected by the data card requires that B data information be entered into the product accumulator in complement form (as when it is to be subtracted from A data information entered into the accumulator in true form). The fixed relay contacts 2–34 and 2–38 are connected to one movable contact of a "negative" multiply relay 2–41, and the fixed contacts 2–36 and 2–40 to the other movable contact of this relay, which is also actuated by punched data card program control when it is desired that the product of a multiplication operation shall effectively be entered into the product accumulator in a form complementary to that of the factors previously entered in the product counter. This is done by causing the factors to be added directly to the product counter to be subtracted and vice versa, adding the product, then reversing the sign of the product counter on read-out. The movable contacts of relay 2–41 normally engage fixed contacts 2–43 and 2–44, but when actuated move to engage fixed contacts 2–45 and 2–46. The relay contacts 2–43 and 2–46 comprise one input circuit of an AND gate 2–47 having a second input circuit comprised by the output circuit 1–49o of the cathode follower 1–49 which develops 9's pulses as earlier described. The fixed relay contacts 2–44 and 2–45 comprise one input circuit of an AND gate 2–48 having a second input circuit comprised by the output circuit 1–49o of the 9's cathode follower 1–49.

Considering at this point the function of the relay system last described, it will be apparent that during read-in time (when the read-in trigger 1–26 is on) a potential is developed in the output circuit of the cathode follower 2–29 during the off period of the primary counter unit 1–21 (the first and second read in cycle) and a potential is developed in the output circuit of the cathode follower 2–30 when the primary counter unit 1–21 is on (the third and fourth cycle). Assuming that it is desired to enter both A and B data information into the product accumulator in true form, as during an addition operation, the relays 2–31 and 2–32 are actuated to engage their respective contacts 2–34 and 2–38 so that the potentials translated by the cathode followers 2–29 and 2–30 are applied through the normally closed contacts of the relay 2–41 to the AND gate 2–47 which thereupon translates 9's pulses to an amplifier 2–49. These pulses are reversed in polarity and translated to the output circuit 2–49o of the amplifier 2–49 and are applied to an input circuit of each of a plurality of AND gates 3–77–3–92.

The other input circuit of the latter gates is comprised by the respective output circuits 3–60o–3–75o of the data storage triggers 3–60–3–75. As long as any of the last mentioned triggers are off, their associated gate 3–77–3–92 is not open and accordingly does not translate 9's pulses applied to the gate by the amplifier 2–49. It will be recalled from the description of the Fig. 1 arrangement that these 9's pulses are developed beginning at number eight primary time when the primary counter units 1–15, 1–17 and 1–18 are on. However, the 9's pulses are translated by any of the gates 3–77–3–92 as soon as its associated data storage trigger turns on. This can only occur, as earlier explained, when the read-in trigger 2–21 turns on to open up the AND gates 3–26A–3–41A during the first read-in cycle or the AND gates 3–26B–3–41B during the third read-in cycle.

The time when the read-in trigger 2–21 turns on is established by the input matrix in dependence upon the data row being read at any time at the card reading station of the business machine. Further, and as more clearly shown in Fig. 2a, the read-in trigger 2–21 turns on for card row 1 sufficiently late that only one of the 9's pulses occurs after the trigger turns on so that in this case only one pulse from the amplifier 2–49 is available for translation by the AND gates 3–77–3–92 should any of the triggers 3–60–3–75 be turned on by a punched hole in row 1 of a data card. On the other hand, and referring again to Curve I of Fig. 2a, the read-in trigger 2–21 turns on at the beginning of eight primary time for read in of row 9 of the data card and thus all 9 pulses from the amplifier 2–49 are available to be translated by the AND gates 3–77–3–92 if any of the associated triggers 3–60–3–75 should be turned on by a punched hole in the 9 row of the data card. It is apparent from this that the pulses translated by the AND gates 3–77–3–92 evaluate each data bit appearing in the A and B fields of the data card, and effectively comprise individual electrical signals having numbers of pulses corresponding to the value of the data bit. In this it should be borne in mind that the translated pulses of these gates represent the data information in true form since it was earlier assumed that it was desired to enter the data information into the product register in true form and for this purpose the relays 2–31 and 2–32 were assumed to be closed to their respective contacts 2–34 and 2–38.

Whenever it is desired that the data information to be entered into the product accumulator in complementary form, as when B data information is to be subtracted from A data information or vice versa, the appropriate relay 2–35 or 2–39 is actuated to engage its contact 2–36 or 2–40. This opens up the AND gate 2–48 which translates 9's pulses through an amplifier 2–50 to each of a plurality of AND gates 3–94–3–108. It will be explained later in connection with the divide operation that 10's pulses are supplied at this time to a units AND gate 3–93. The other input circuit of each of the gates 3–93–3–108 is comprised by the respective output circuit 3–60o'–3–75o' of the data store triggers 3–60–3–75 so that the gate 3–93 translates 10's pulses and the gates 3–94–3–108 translate 9's pulses as long as their associated store trigger remains off. In order that this complementing evaluation may be more clearly perceived, curve N of Fig. 2a represents the turn-on time of the read-in trigger 2–21 during read in of the seventh row of the data card. As before, curve L represents 9's pulses developed in the output circuit of the cathode follower 1–49 and applied through AND gate 2–48 and the amplifier 2–50 for translation by the AND gates 3–94–3–108. Thus for read in of the seventh row of the data card it will be apparent from comparison of curves L and N that the last mentioned AND gates translate two pulses (curve P) prior to the time when any of the triggers 3–60–3–75 are turned on by data information punched into the seventh card row. These two translated pulses correspond to the 9's complement of the numeral 7 and thus evaluate such seventh row data information in complementary form. It will be likewise clear from the foregoing that the gate 3–93, supplied with 10s pulses, translates one more pulse than do the gates 3–94–3–108 to provide correct complement subtraction.

In practice, a subtract operation usually will involve subtracting B data information from A data information and in such case the relays 2–31 and 2–32 will be respectively energized and de-energized to enter the A data information in true form into the product accumulator whereas relays 2–35 and 2–39 will be respectively de-energized and energized to enter the B data information in complement form into the product accumulator.

This entry of data information into the product accumulator will now be considered in detail. The output circuits of the AND gates 3–77–3–92 and 3–93–3–108 comprise input circuits of respective OR units 3–109–3–124. The output circuits of the latter are coupled to the input circuits of respective counter or register units 3–125–3–140 which comprise the product accumulator earlier referred to. Each of these units may conveniently be of the 9-step binary counter form similar to the tandem arrangement of the primary counter units 1–15–1–19 of Fig. 1. Each such counter unit stores a number corresponding to the count of the potential pulses applied to the input of the unit from its associated OR unit. In certain operations, as when A data and B data information is added in the product accumulator, the binary count of the data information may result in conventional manner in a carry out. Each of the counter units 3–125–3–140 accordingly has associated with it a respective carry store trigger 3–141–3–156 so arranged that the carry store trigger turns on when the binary 8 counter trigger of the associated register unit turns off or carries out. Any carry store triggers which have been so turned on during the add or subtract operation of the first and third read-in cycles are turned off by clock pulses supplied through an output circuit 1–51o of the amplifier 1–51 during the second and fourth read-in cycles.

Each carry store trigger has an output circuit coupled through a diode rectifier DR and a resistor R to the input of the next higher-order register counter so that when the carry trigger turns off as last mentioned it inserts a binary 1 in the higher order register. Should this cause the higher order register to carry out and turn on its associated carry store trigger, the next pulse translated by the amplifier 1–51 turns such trigger off and causes a 1 to be added to a higher order trigger. The carry store triggers are repeatedly pulsed by clock pulses during the second and fourth read-in cycles, and all carries stored by the triggers are inserted back into higher orders of the product register. There is no higher order register for the carry store trigger 3–156 to insert a carry into, and this trigger is used for sign control purposes in a manner later to be explained.

Since the product accumulator includes sixteen digit registers, sixteen digits of A data information may be added or subtracted from sixteen digits of B data information, or vice versa, or two eight-digit fields of A data information may be processed with two eight-digit fields of B data information. The data information is then so recorded in the data card, and two eight-digit fields are processed simultaneously in the add or subtract operation.

Multiplication operation

For purposes of multiplication, the computer includes two eight-digit registers into individual ones of which the multiplier and multiplicand read from a data card are stored until a "calculate" interval which follows the card read-in interval. The multiplication process is one of successive additions of the multiplicand to provide partial products, the development of the latter starting with the highest order of the product and proceeding to lower orders thereof. The number of times that the multiplicand is so added at each order of the partial product is determined by successive reductions of the multiplier digits one by one starting with the highest order digit and proceeding to lower order digits. A column shift matrix is used in the computer to transfer the multiplicand to successively lower orders in the product accumulator in developing successive partial products. For purposes of multiplication, additional units shown in Figs. 4–7 are employed and the arrangement of figures is that indicated in Fig. 11.

The multiplicand storage register is shown in Fig. 4 and includes a plurality of AND gates 4–10–4–17 having respective input circuits 4–18–4–25 connected to read brushes of the multiplicand data information field of the reading station of the associated business machine. The other input circuit of these AND gates is comprised by an output circuit 2–53o of an amplifier 2–53 of the Fig. 2 control system. The amplifier 2–53 has an input circuit coupled to the output circuit of an AND gate 2–54 having three input circuits. One of these is the output circuit 1–35o of the cathode follower 1–35 which conditions the AND gate 2–54 during the on period of the binary 32 counter unit 1–21 (the second and fourth read-in cycle). A second input circuit of the AND gate 2–54 is comprised by the output circuit 1–49o of the cathode follower 1–49 which develops 9's pulses as earlier explained. The third input circuit of the gate 2–54 is comprised by the output circuit of a cathode follower 2–55 which is coupled to the output circuit 2–21o of the read-in trigger 2–21 to condition the AND gate 2–54 to open when the trigger 2–21 turns on.

Thus during the on period of the trigger 2–21 and the on period of the primary counter unit 1–21 the AND gate 2–54 translates 9's pulses to the amplifier 2–53 and these pulses are accordingly applied through the output circuit 2–53o of the latter to the AND gates 4–10–4–17 of the multiplicand register. Since the read-in trigger 2–21 turns on at a time depending upon the particular data-card row which is being read at any given moment, it will be apparent that the 9's pulses translated by the amplifier 2–53 and applied to the AND gates 4–10–4–17 evaluate the data information read in from the reading station in much the same manner as explained above in connection with the add-subtract operation. The potential pulses translated by the AND gate 4–10–4–17 are supplied to respective binary counters 4–27–4–34 which thus store the multiplicand data information as it is read in during the second read-in cycle.

The multiplicand counters 4–27–4–34 also have respective input AND gates 4–36, 4–43 which are conditioned by a common positive potential, indicated as +E, and are supplied with 10's pulses through a circuit 6–10o from a source which will be described later in connection with the Fig. 6 control system. These 10's pulses are translated by the gates 4–36–4–43 to "roll" the multiplicand register through ten counts and thereby effectively read the multiplicand out of the register while at the same time reinserting the same multiplicand back into the register. For example, assume that the counter 4–34 stores the numeral 3. The sixth pulse translated by the AND gate 4–43 causes the counter to store a 9, the seventh pulse causes it to carry out and thereupon store a 0, and the tenth pulse causes it to restore its initial 3.

As each counter of the register carries out, a negative potential pulse is developed in a corresponding one of the register output circuits 4–27o–4–34o.

These potential pulses are applied to respective cathode followers 4–45–4–52 which have identical circuit arrangements of the type shown in detail for the cathode follower 4–52. It will be seen that each cathode follower includes a triode form of vacuum tube 4–53 having a control grid to which the output circuit of a corresponding counter (i.e. the output circuit 4–34o of the counter 4–34) is coupled through a differentiating network comprising a series condenser 4–54 (100 micromicrofarads) and a shunt resistor 4–55 (200,000 ohms). The control grid is biased through a voltage divider comprising the resistor 4–55 and a resistro 4–56 (200,000 ohms) to render the tube 4–53 normally fully conductive, a series grid resistor 4–57 (22,000 ohms) being used to limit the grid-to-cathode current during periods when the grid is driven in a positive direction. A diode rectifier 4–58, biased from a potential divider 4–59, prevents the grid of this tube from dropping below ground potential when a negative pulse is applied thereto from the associated counter. Thus when the associated counter applies a negative potential pulse to the cathode follower, this pulse is differenitated by the input circuit of the latter to develop a sharp negative pulse of short duration. A corresponding negative pulse potential is developed across an output cathode resistor 60 included in the output circuit of the cathode follower stage.

It will be noted that the time of occurrence of the negative pulses developed in the output circuits 4–45o–4–52o of the cathode followers varies with the value of the digit of the multiplicand stored in the associated counter. For example, assuming that the counter 4–27 stored a 9 digit, only one pulse would need to be translated by its input gate 4–36 to cause this counter to carry out and develop a negative potential pulse in its output circuit 4–27o and a corresponding negative pulse in the cathode follower output circuit 4–45o. On the other hand if it be assumed by way of further example that the counter 4–27 stored a 3 digit of the multiplicand, 7 pulses would need to be translated through the gate 4–36 to produce negative potential pulses in the output circuits 4–27o and 4–45o. The time at which this pulse is developed in the output circuit of each cathode follower is thus related to the time of the first of the 10's pulses applied to the input gates 4–36–4–43 of the multiplicand register, and accordingly is analogous to the time when any of the product accumulator triggers 3–60–3–75 is turned on to evaluate a given digit of the data information read-in from a card. The output pulses of the multiplicand register are translated through a column-shift matrix (later to be described), and are used to turn on the last-mentioned triggers and thereby evaluate for each roll-out operation the digit values of the multiplicand digits stored in the multiplicand register. The exact manner in which this is accomplished will be explained later in connection with the description of the column-shift matrix and its operation.

Figure 5:
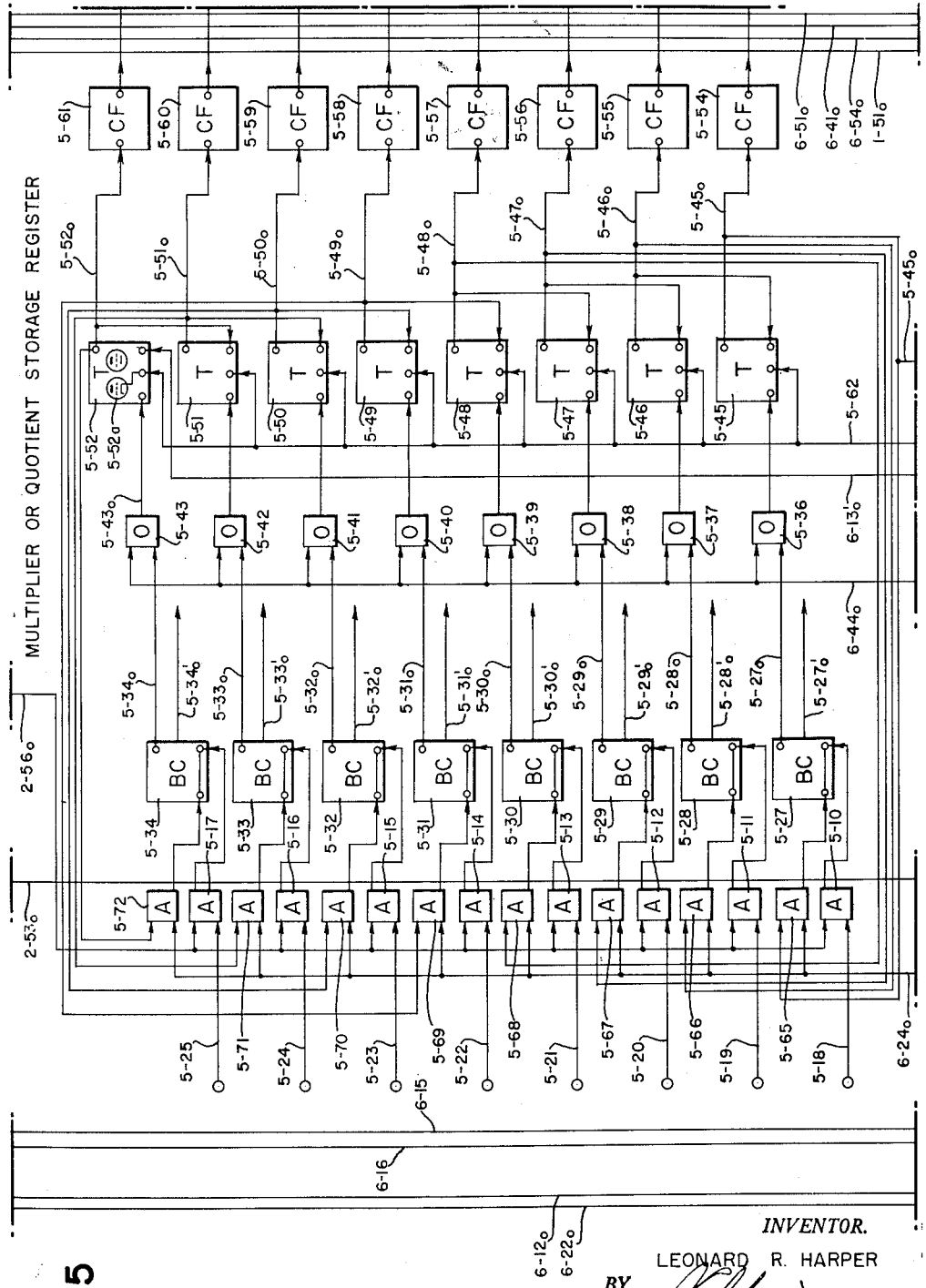
Fig. 5 is a circuit diagram of a multiplier or quotient register used in the computer.

The multiplier storage register is shown in Fig. 5 and similarly includes a plurality of AND gates 5–10–5–17 having respective input circuits 5–18–5–25 which are connected to the multiplier field read-in brushes of the reading station of the associated business machine. The other input circuit of the AND gates 5–10–5–17 is comprised by an output circuit 2–56o of an amplifier 2–56 which has an input circuit comprised by the output circuit of an AND gate 2–57. The latter includes three input circuits of which one is comprised by the output circuit 1–35o of the cathode follower 1–35 which conditions the AND gate to open during the on period of the binary 32 counter unit 1–21 of the primary counter. A second input circuit of the AND gate 2–57 is comprised by the output circuit 1–48o of the cathode follower 1–48 which develops 10's pulses as earlier explained.

A third input circuit of the gate 2–57 is comprised by the output circuit of a cathode follower 2–58 which is coupled to the output circuit 2–21o' of the read-in trigger 2–21. It will be apparent from this described arrangement that the AND gate 2–57 translates 10's pulses during the off period of the read in trigger 2–21 and the on period (third and fourth read in cycles) of the primary counter unit 1–21.

These pulses are translated by the register AND gates 5–10–5–17 whenever a gate is opened up by a brush potential applied thereto due to a punched hole in the card read at the read station of the associated business machine. Pulses are supplied by the amplifier 2–56 to the last mentioned gates only during the off period of the read-in trigger 2–21. It will be apparent from the foregoing description that the number of pulses translated by each AND gate corresponds to the 9's complement of each individual data digit value. These translated pulses are applied from the AND gates 5–10–5–17 to the input circuits of respective binary counters 5–27–5–34 which are initially reset to store a 9 (complemented zero) and accordingly store the multiplier data information in complement form. The reason for storing this information in complement form will become apparent hereinafter in considering the multiplication operation.

During the multiplication operation later to be described, it will be explained that the counters 5–27–5–34 are caused to carry out in succession and that each carry out develops a negative potential pulse in the respective counter output circuits 5–27o–5–34o. This pulse is translated through a respective OR unit 5–36–5–43 to turn off a respective tertiary trigger 5–45–5–52. These tertiary triggers are so operated that the trigger 5–52 is initially turned on and the remaining triggers are initially turned off. When the trigger 5–52 is then turned off by a negative potential pulse translated through the OR unit 5–43, it turns on the tertiary trigger 5–51 which when later turned off causes the tertiary trigger 5–50 to turn on. These triggers accordingly operate to cause successive ones of the triggers to be turned on in order from the trigger 5–52 to the trigger 5–45. During the period when any of the triggers 5–46–5–52 is on, an elevated potential is developed in its respective output circuit 5–45o–5–52o and this potential is translated by a respective cathode follower 5–54–5–61 to the respective output circuits 5–54o–5–61o of the latter. The translated potentials last mentioned control the operation of the column-shift matrix now to be described.

Figure 7:
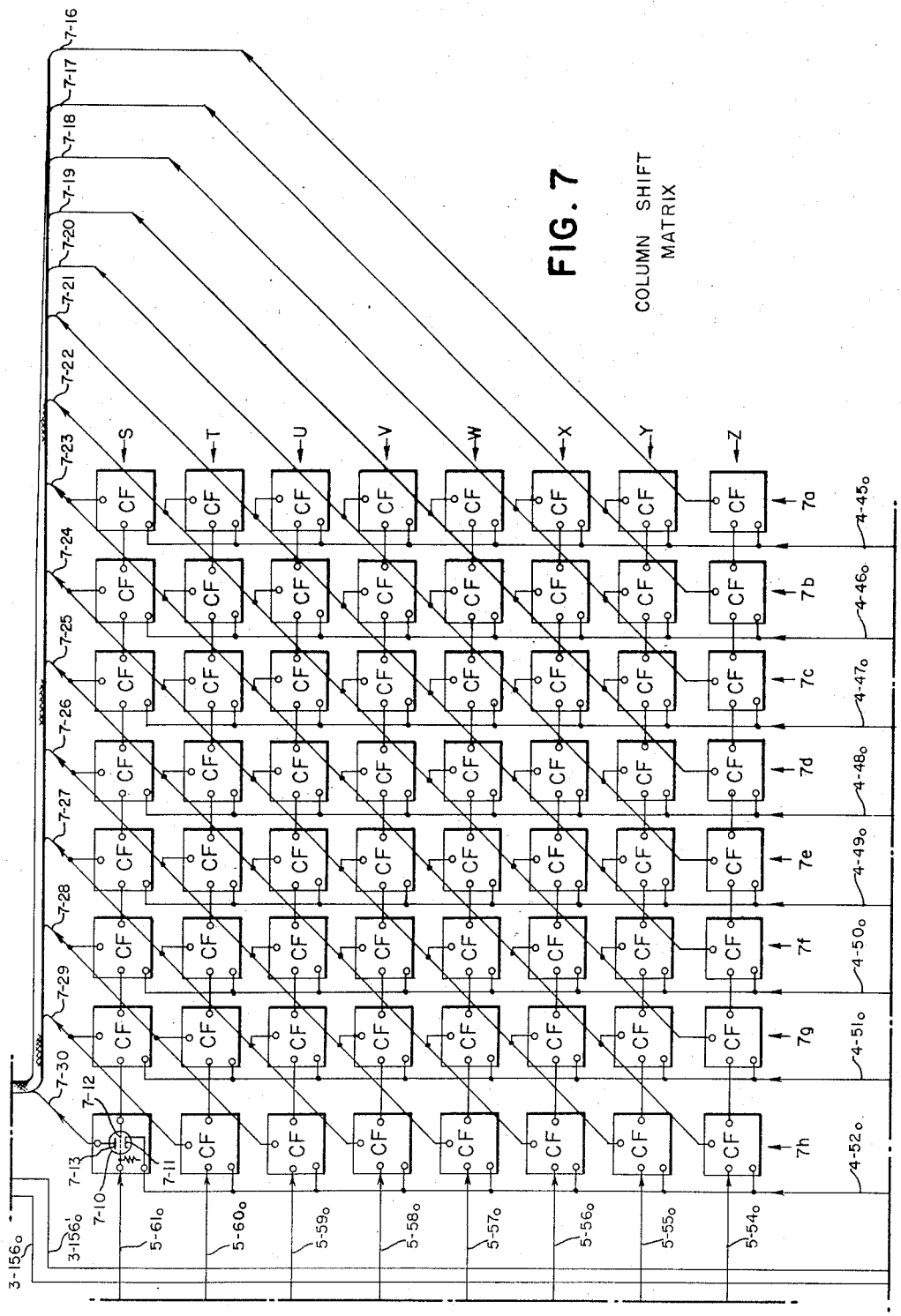
Fig. 7 shows the arrangement of a column-shift matrix employed in the computer.

The column-shift matrix is shown in Fig. 7 and is comprised of a plurality of cathode-coupled amplifiers arranged in related rows and related columns of units. The columns of cathode-coupled amplifiers are identified by the reference numerals 7a–7h, and the rows of cathode-coupled amplifiers are identified by the letters S–Z. Any cathode-coupled amplifier in this matrix will accordingly be hereinafter identified by reference to its column and row position. Each cathode-coupled amplifier has a construction identical to that shown for the unit 7hS and may include a triode form of vacuum tube 7–10 having a cathode 7–11 connected in common with the cathodes of the other cathode-coupled amplifiers in its column thereof to individual ones of the output circuits 4–45o–4–52o of the Fig. 4 multiplicand register as shown. Each column-shift matrix tube 7–10 also includes a control electrode 7–12 which is connected in common with the control electrode of the other cathode-coupled amplifier in its row thereof and to an individual one of the output circuits 5–54o–5–61o of the Fig. 5 multiplier register as indicated. Each matrix vacuum tube also includes an anode 7–13, and the anodes of the matrix tubes are connected in common in diagonal rows as shown to provide fifteen matrix output circuits 7–16–7–30 which are connected to the respective output circuits 3–60o'–3–74o' of the data storage triggers 3–60–3–74 of the product accumulator of Fig. 3. It will be obvious that the cathode, control electrode, and anode are analogous to the emitter, base and collector of a transistor and that the circuit will operate as shown in the medium of transistors.

Considering briefly the operation of the column-shift matrix, it will be recalled from the description of the multiplier register arrangement of Fig. 5 that elevated potentials are developed in the register output circuits successively and in order from the output circuit 5–61o to the output circuit 5–54o. As an elevated potential is developed in each such output circuit, it conditions the cathode-coupled amplifiers of the associated row thereof to translate potential pulses from the multiplicand register of Fig. 4 to the product accumulator triggers of Figs. 3a and 3b. Thus for example when an elevated potential is developed in the output circuit 5–61o of the multiplier register, the S row of cathode followers is conditioned to translate potential pulses from the output circuits 4–45o–4–52o of the multiplicand register to the respective triggers 3–67–3–74 of the product accumulator to turn these triggers on by pull-over at a time which is dependent in the case of each trigger upon the value of the corresponding multiplicand digit as explained in connection with Fig. 4. As the multiplier register output circuit potentials successively condition the successive rows of cathode followers in the matrix, the output of the multiplicand register is successively transferred to lower order product accumulator triggers until eventually the Z row of matrix cathode followers translate the multiplicand output to the triggers 3–60–3–67 of the product accumulator. Thus the partial products developed in the product accumulator are developed first in the higher order digit positions of the accumulator and last in the lower order digit positions thereof.

Considering now the multiplication operation in greater detail, and referring to the control system of Fig. 6, a calculate trigger 6–13 is turned on for the calculate interval after read in is completed by an AND gate 6–14. This gate has three input circuits, of which two are comprised by control circuits 6–15 and 6–16 connected to the respective CB's 2–15 and 2–18 which are closed during read-in of the ninth row of the data card. The third input circuit of the gate 6–14 is comprised by the output circuit 1–35o of the cathode follower 1–35. It will be apparent that all of the input circuits of the gate 6–14 are at elevated potentials during the read-in time of the ninth row of the data card and the fourth read-in cycle when the binary 32 counter unit 1–21 of the primary counter is on, and that the latter in turning off at the end of the fourth read-in cycle thereupon turns the calculate trigger 6–13 on. The potential in the output circuit 6–13o' of the trigger 6–13 drops to turn the tertiary trigger 5–52 (initially reset off with the other tertiary triggers) of the multiplier register on. The potential in the output circuit 6–13o of the trigger 6–13 rises at the same time and through cathode follower 6–12 opens up the AND gate 1–11 of Fig. 1 so that clock pulses are translated from the multivibrator 1–10 to the primary counter 1–15–1–20 to initiate the counting operation of the latter.

The "multiply" program instruction is carried by a coded punched hole in a data card and serves to control a multiply-divide relay 6–18 to close its contact 6–19 to ground. This completes the energizing circuit of an inverter 6–20 having a differentiating type of input circuit coupled to the output circuit 1–32o' of the cathode follower 1–32. Thus the elevated potential applied to the input circuit of the inverter 6–20 when the binary 16 counter unit 1–20 of the primary counter turns off at the end of the fourth read-in cycle is differentiated in the input circuit of the inverter 6–20 to develop a positive potential pulse of short duration which is inverted by the inverter 6–20 to develop a negative potential pulse in its output circuit. This negative potential pulse produces a voltage drop across the resistors 6–21 which are included in the anode circuit of the "on" tube of a multiply-quotient test trigger 6–22. The negative output pulse of the inverter 6–20 accordingly turns the trigger 6–22 on by pull-over. The output 1–28o of the cathode follower 1–28 coupled to the primary counter binary 1 counter unit 1–15 turns off the test trigger 6–22 at the end of the first binary count.

Thus there is developed across the anode resistor 6–21 by the action of the test trigger 6–22 a negative potential pulse which is applied to a cathode follower 6–23 having a differentiating type of input circuit to reduce the duration of this pulse. The pulse of reduced duration is accordingly translated through the cathode follower 6–23 and an inverter 6–24 and is applied as a test pulse to each of a plurality of AND gates 5–65–6–72 coupled to the input circuits of the respective multiplier register counters 5–27–5–34. The tertiary triggers 5–45–5–52 when on condition the respective AND gates 5–65–6–72 to translate the test pulse. Since at the time presently considered only the tertiary trigger 5–52 is on, only the AND gate 5–72 translates the test pulse of the inverter 6–24. This translated test pulse is inserted into the register counter 5–34 and adds to the multiplier digit stored therein. Assume for purposes of illustration that the register counter 5–34 stores a 9 (zero complemented) corresponding to a zero valued digit in the highest order of the multiplier. The test pulse translated through the gate 5–72 causes the counter 5–34 to carry out, and accordingly to develop a negative output pulse in its output circuit 5–34o. This pulse is translated by the OR unit 5–43 to develop a negative pulse in its output circuit 5–43o which is effective to turn the tertiary counter trigger 5–52 off and thereby turn the tertiary counter trigger 5–51 on. The latter conditions the AND gate 5–71 to translate to the counter 5–33 the next test pulse generated in the following manner.

As indicated by the tertiary counter trigger 5–52, the cathode circuit of the "on" vacuum tube 5–52a of each trigger unit is connected to a common cathode circuit 5–62 which is connected to the cathode circuit of a tube 6–26 included in a multiply-test control unit 6–27. The output circuit of the tube 6–26 is coupled through a condenser 6–28 to a second vacuum tube 6–29 of the unit 6–27. The anode circuit of the tube 6–29 includes the anode resistors 6–21 of the multiply test trigger 6–22, and the control electrode of the tube 6–29 is connected to ground through a diode rectifier 6–30 so polarized as to keep the control electrode from going below ground potential.

When any of the tertiary counter triggers 5–45–5–52 is on, the anode-cathode current of its on tube (i.e. tube 5–52a) flows through the cathode resistor 6–31 of the tube 6–26 and reduces the anode current of the latter to cause the anode potential of this tube to rise. When any one of the tertiary counters 5–45–5–52 turns off, there is approximately a microsecond delay before the next succeeding tertiary counter turns on and during this short delay interval the potential developed across the cathode resistor 6–31 disappears and the tube 6–26 draws substantial anode current. This reduces the anode potential of this tube, and the coupling condenser 6–28 thereupon discharges through the diode rectifier 6–30. Now when the next tertiary counter turns on and again effects a reduction of the anode current of the tube 6–26, the anode potential of the latter rises.

This elevated potential is applied through the coupling condenser 6–28 to the control electrode of the tube 6–29, which is normally fixedly biased below anode-current cut off (by a potential divider comprised by series resistors 6–32 and 6–33) whenever the multiply-divide relay contact 6–19 is closed to ground. The elevated potential applied from the tube 6–26 to the control electrode of the tube 6–29 causes the latter to draw current through the resistors 6–21 and thus turn on the test trigger 6–22 by pull-over. The latter is almost immediately turned off by action of the binary 1 counter unit 1–15 of the primary counter, so that the trigger 6–22 again generates a test pulse which is translated through the cathode follower 6–23 and the inverter 6–24 to the AND gates 5–65–5–72 of the multiplier register. It may be noted in connection with the generation of this test pulse that the test trigger 6–22 is not turned on until the succeeding tertiary trigger 5–51 turns on to reduce the anode current of the tube 6–26 of the test control unit 6–27, thus establishing a safety provision to be sure that the generated test pulse which pulsed tertiary trigger 5–52 off is of sufficiently long duration rather than being a mere brief "spike" potential which might be of inadequate length to insure that said trigger 5–52 stays off.

Since under the assumed conditions the tertiary counter trigger 5–51 is now on, this test pulse is translated only by the AND gate 5–71 to the multiplier register counter 5–33. If this counter also stores a 9 (zero complemented), it carries out to generate a negative pulse in its output circuit 5–33o which causes the tertiary counter trigger 5–51 to turn off and the succeeding counter trigger 5–50 to turn on in the manner previously explained. In the interval between turn-off of the trigger 5–51 and turn-on of the trigger 5–50, the test control unit 6–27 again becomes operative and causes the test trigger 6–22 to generate another test pulse in the manner above described. This test pulse likewise is translated through cathode follower 6–23 and the inverter 6–24 to the multiplier register AND gates 5–65–5–72.

Test pulses continue to be thus rapidly generated at clock-interval rate and applied to the multiplier register gates 5–65–5–72 until one of the register counters 5–27–5–34 of succeedingly lower order fails to carry out and by that fact is found to store the first significant digit of the multiplier. Up to this point, the register counters of higher order which have stored complemented zeros have been tested at clock pulse rate by the coordinated operation of the test control unit 6–27, the test trigger 6–22, and the binary 1 counter unit 1–15 so that zeros appearing in the higher order digits of the multiplier have been quickly passed over. It may here be noted parenthetically that zeros appearing in any digit position of the multiplier likewise are rapidly passed over at clock pulse rate. This has the virtue that only significant digits of the multiplier use calculation time whereas zero valued digits of the multiplier use no significant part of the calculate interval and thereby conserve the maximum amount of the calculate interval for actual data processing.

When the test pulse of the test trigger 6–22 after translation by one of the register gates 5–65–5–72 to one of the register counters 5–27–5–34 fails to cause the counter to carry out, this fact indicates as earlier mentioned that the complemented number standing in the counter is not a zero and thus that the counter stores a significant digit of the multiplier. Assume that this occurs in the register counter 5–32, and assume further that this counter stores the numeral 7 (a complemented 2). The test pulse adds to the stored 7 to cause the counter now to store an 8 (complemented 1), and no output pulse is accordingly generated in the output circuit 5–32o of the trigger 5–32 to turn the tertiary counter trigger 5–50 off. Several events now occur.

First, the fact that the tertiary trigger 5–50 did not turn off has the result that the test control unit 6–27 does not operate and the test trigger 6–22 does not generate a further immediate test pulse. Secondly, the test trigger 6–22 in staying off produces an elevated potential in its output circuit 6–22o which opens the AND gate 1–16 of Fig. 1 and causes the primary counter 1–17–1–21 to resume its counting operation. In this connection, it may be noted that the AND gate 1–16 is closed and the primary counter operation suspended whenever the test trigger 6–22 generates a test pulse for the reason that this trigger is on at the time the primary binary 1 counter unit 1–15 turns off so that the gate 1–16 is closed down and the binary 2 counter unit 1–17 of the primary counter accordingly is not turned on. Thirdly, the calculate trigger 6–13 through cathode follower 6–12 opens up the AND gate 6–11 of an amplifier 6–10 which translates 10's pulses from the output circuit 1–48o of the cathode follower 1–48. These 10's pulses are only generated when the primary counter 1–15–1–21 is performing a counting operation, as now occurs, and are applied to the AND gates 4–36–4–43 of the multiplicand register of Fig. 4. These 10's pulses cause the latter register to "roll" out and thereby translate the multiplicand through the row U (the tertiary trigger 5–50 being on at this time) of the column-shift matrix to the product accumulator triggers 3–65–3–72 to turn the latter on at times dependent upon the individual digit values of the multiplicand. Fourthly, the calculate trigger 6–13 through cathode follower 6–12 also conditions AND gates 6–35 and 6–36 to open, but only one of these gates actually opens dependent upon which of a pair of respective cathode followers 6–37 or 6–38 translates an elevated potential to the gate in accordance with the on or off condition of an add-subtract trigger 6–39.

The latter is initially reset off and stays off for a multiply operation since its input terminal 6–39a is grounded through a resistor 6–40 and the multiply-divide relay contact 6–19 is closed at this time. With the trigger 6–39 off, the cathode follower 6–38 translates an elevated potential to the gate 6–36 which accordingly translates this elevated potential through a cathode follower 6–41 and the output circuit 6–41o of the latter to the gate 2–47 of the Fig. 2 arrangement. The gate 2–47 thereupon opens to translate 9's pulses through the amplifier 2–49 to the add gates 3–77–3–92 of the product accumulator. This causes the multiplicand, which is now stored in the product accumulator triggers 3–65–3–72 as just explained, to be added to the number stored in the product accumulator at this time. Note in this regard that the insertion of the multpilicand into the product accumulator can only occur during the time the binary 16 unit of the primary counter is off to permit 9's and 10's pulses to be generated by units 1–40–1–45, 1–48 and 1–49. Thus this insertion can only occur in the odd or "add" cycles of the primary counter. Any carries produced in the product accumulator when the multiplicand is inserted into it are reinserted into higher order counters of the product accumulator during the even or "carry" cycles of the primary counter, the binary 16 unit 1–20 being on at these times to cause the gate 1–50 to open up and translate clock pulses through the amplifier 1–51 and the carry-trigger reset output circuit 1–51o.

After the multiplicand has been inserted once into the product accumulator as above described during the first cycle of the primary counter 1–15–1–20, and the carries have been reinserted into the product accumulator during the second cycle of the primary counter, the binary 16 unit of the primary counter turns off to begin the next add cycle of counter operation. In doing so, it is prevented from turning on the binary 32 trigger (used only in read in operation) by action of gate 1–22 (under control of read-in trigger 1–26o) but turns on the test trigger 6–22 through the inverter 6–20. The test trigger 6–22 is turned off by action of the binary 1 unit of the primary counter, and thereby generates a test pulse which is applied as before through cathode follower 6–23 and the inverter 6–24 to the gates 5–65–5–72 of the multiplier register. It was assumed above that the multiplier register counter 5–32 initially stored a 7 (complemented 2), and it was pointed out that the first test pulse was added to the 7 to cause a counter 5–32 to store an 8. The test pulse generated as last mentioned is again translated by the AND gate 5–70 and causes the counter 5–32 to now store a 9. This again does not cause the counter 5–32 to carry out and develop a negative pulse in its output circuit 5–32*o*, so the tertiary trigger 5–50 remains on. This fact causes the multiplicand stored in the multiplicand register of Fig. 4 again to be inserted through row U of the cathode-coupled amplifiers of the column-shift matrix of Fig. 7 into triggers 3–65–3–72 of the product accumulator and thus to be added to the multiplicand which was stored in the product accumulator during the first cycle of the primary counter. This is equivalent to multiplying the multiplicand by a factor of 2. As before, the carry store triggers 3–141–3–155 are reset to reinsert carries during the carry cycle of the primary counter.

When the binary 16 unit of the primary counter again turns off to initiate the next or add cycle of operation of the primary counter, it causes the trigger 6–22 through inverter 6–20 again to generate a test pulse. Now when this pulse is translated by the gate 5–70 of the multiplier register it causes the counter 5–32 (previously storing a 9 under the assumed conditions) to carry out and develop a negative pulse in its output circuit 5–32*o* which turns the tertiary trigger 5–50 off and thereby causes the tertiary trigger 5–49 to turn on. During the tertiary trigger transition last mentioned, the test control unit 6–27 and test trigger 6–22 generate a test pulse which is now translated through the multiplier register gate 5–69 to the counter 5–31. Should this counter store a 9 (zero complemented), a test pulse is immediately generated and applied to the multiplier register trigger 5–30. Otherwise the multiplier digit stored in the multiplier register counter 5–31 is successively reduced by each test pulse applied to this counter and each reduction causes the multiplicand stored in the multiplicand register to be translated through the column-shift matrix and inserted in the product accumulator. In doing so, however, the on condition of the tertiary trigger 5–49 causes the multiplicand now to be translated through the V row of cathode-coupled amplifiers of the column-shift matrix so that the multiplicand is now inserted in the lower order group of product accumulator triggers 3–64–3–71.

This procedure continues from the highest order counter of the multiplier register to the lowest order counter thereof, the multiplicand being inserted into successively lower order triggers of the product accumulator through the column-shift matrix under control of the tertiary triggers 5–45–5–52. As this operation continues, a final test pulse translated through the multiplier register gate 5–65 causes the counter 5–27 to carry out and turn off the tertiary trigger 5–45. When this occurs, the negative pulse developed in the output circuit 5–45*o* of the trigger 5–45 turns off the calculate trigger 6–13 and thereby terminates the multiply operation.

It may be noted in connection with the multiplication operation above described that the action of the gate 1–16 of the primary counter under control of the multiplier test trigger 6–22 is such that the primary counter may simply operate with the binary 1 unit 1–15 alone counting clock pulses or with the counter continuing through its two cycles of operation to count a total of 32 clock pulses. In this, the control of the test trigger 6–22 over the counter operation controls the multiplication operation in entirety, particularly in that the test trigger 6–22 merely terminates the multiplication operation while testing for zero storages in the multiplier register from the highest toward the lowest orders of the multiplier digits and permits the multiplication operation to proceed only when significant digits of the multiplier (from the highest to the lowest orders thereof) are successively reduced by the generated test pulses to cause successive additions of the multiplicand to itself from higher to lower orders in the product accumulator. Each such addition of the multiplicand to itself occurs only in the add cycles of the primary counter, and any carries resulting from such addition in the product accumulator are reinserted into the latter during the carry cycles of the primary counter.

*Division operation*

Division is accomplished by storing the dividend in the product accumulator, by storing the divisor in the register of Fig. 4 (the multiplicand or divisor storage register), and by successive subtractions of the divisor from the stored dividend proceeding from higher to lower orders of the latter. Each time that a successful reduction of the dividend by the divisor occurs, a one is stored in the register of Fig. 5 (multiplier or quotient storage register) starting with the highest order counter of the register and proceeding to the lower orders thereof. The successive reductions from each given order of a dividend continue until an overdraw occurs, at which time the amount last subtracted is added back into the dividend and the next succeeding reductions occur from succeedingly lower orders of the dividend. The quotient thus becomes stored in the Fig. 5 register, and the remainder remains in the product accumulator.

The detailed division arrangement and operation will now be considered. The data-card controlled multiply-divide relay 6–18 is operated on divide to close its contact 6–43 to ground. This deenergizes the multiply inverter 6–20 and test control unit 6–27, conditions for operation an inverter 6–44, and also conditions for operation two AND gates one of which is comprised by a resistor 6–45 and a diode rectifier 6–46 and the other by a resistor 6–47 and a diode rectifier 6–48.

When the calculate trigger 6–13 is turned on by the CB contactors 2–15 and 2–18 and at the end of the fourth cycle of operation of the primary counter 1–15–1–21, it turns on the tertiary trigger 5–52 as in the multiplication operation described. The elevated potential of the calculate trigger output circuit 6–13*o*′ is also applied through the AND gate 6–47 and 6–48 to turn on an incomplete division trigger 6–49. The latter through an inverter 6–50 turns on by pull-over the add-subtract control trigger 6–39 which through the cathode follower 6–37, a gate 6–35 (now opened through the cathode follower 6–12 and the on condition of the calculate trigger 6–13), and a cathode follower 6–51 opens an AND gate 6–53 to translate 10's pulses through an amplifier 6–54 to the units digit subtract gate 3–93 of the product accumulator. The first such pulse translated by the amplifier 6–54 also turns on an add-subtract delay trigger 6–55.

The calculate trigger 6–13 upon turning on conditions through the cathode follower 6–12, the AND gate 1–11 to translate clock pulses to the counter 1–15–1–21 and also conditions the AND gate 6–11 to translate 10's pulses through the amplifier 6–10 to the divisor storage resistor gates 4–36–4–43 to "roll" the divisor through the column-shift matrix of Fig. 7 into the product accumulator triggers 3–60–3–75. As in the multiplication operation described, the rows of cathode-coupled amplifiers S–Z of the column-shift matrix are energized in turn by the tertiary counter triggers 5–45–5–52 of the quotient storage register of Fig. 5 so that the divisor enters the product accumulator triggers from higher to lower orders as the division operation proceeds. Since the division process is by successive reductions of the dividend in the product accumulator by the divisor, the elevated potential in the output circuit 6–51*o* of the cathode follower 6–51 also is applied to the AND gate 2–48 to open up the latter for the translation of 9's pulses through the amplifier 2–50 to the product accumulator gates 3–94–3–108.

As in the subtraction operation described above, the 9's pulses translated through the amplifier 2–50 to the product accumulator gates 3–94–3–108 and the 10's pulses translated through the amplifier 6–54 to the product accumulator units gate 3–93 cause the addition to the dividend stored in the product accumulator counters 3–125–3–140 of the complement of the divisor entered through the column-shift matrix into the product accumulator triggers 3–60–3–75. It will be recalled from the foregoing description of the subtract operation that the addition in the product accumulator of the complement of a number actually results in the subtraction of the number. The subtraction or reduction process occurring during division will now be considered in specific detail.

The tertiary trigger 5–52 having been turned on by the calculate trigger 6–13 as above explained, the carry out of each divisor register counter 4–27–4–34, as these counters are rolled by the pulses translated through the amplifier 6–10, is translated through its associated cathode follower 4–45–4–52 and through the row S of cathode-coupled amplifiers of the column-shift matrix to turn on by pull-over the product accumulator triggers 3–67–3–74. In this, it will be recalled that the number of 10's pulses required to be supplied to any given divisor storage counter 4–27–4–34 evaluates the divisor digit stored in that counter, and that after the carry out of the counter occurs the remaining 10's pulses reset the counter to store its original digit value. Thus the time at which the product accumulator triggers 3–67–3–74 turn on is a direct measure of the value of the corresponding divisor digit, and upon turning on each of the latter triggers terminates further translation of 9's pulses by the gates 3–100–3–107. Thus the corresponding divisor digit is subtracted or reduced from the higher order digits of the dividend stored in the product accumulator counters 3–132–3–139. Note in this regard that the lower-order product accumulator triggers 3–60–3–66 cannot be turned on through the column-shift matrix so that the 9's pulses translated by the product accumulator gates 3–94–3–99 and the 10's pulses translated by the units gate 3–93 inherently cause an initial carry by the product accumulator counter 3–125 and later during the carry interval by each of the counters 3–126–3–131. This and succeeding reduction operations occur in the add cycles of the primary counter (the test pulse trigger 6–22 being off at this time to open the primary counter gate 1–16), and the amplifier 1–51 supplies during the carry cycles of the primary counter clock pulses to the product accumulator carry triggers 3–141–3–156 to enter the carries back into the product accumulator counters. Also, the first clock pulse translated by the amplifier 1–51 during the primary carry cycles is used to turn off the add-subtract control trigger 6–39.

Assume at this point that the reduction of the divisor from the dividend stored in the product accumulator is a successful one. The product accumulator counter 3–125 was supplied with 10's pulses through its gate 3–93 so that this counter goes through a complete cycle and carries out to turn on the carry trigger 3–141. When the latter is turned off by the first clock pulse translated through the amplifier 1–51, it inserts a one in the counter 3–126 which for a successful reduction causes the latter to carry-out and turn on the carry trigger 3–142. Succeeding clock pulses cause in similar manner the carry triggers 3–142–3–156 to turn on and off in succession to leave the carry trigger 3–156 on. The latter is not turned off by clock pulses, but rather by a negative pulse potential translated through the cathode follower 1–33 when the binary 16 unit 1–20 of the primary counter turns off at the end of the carry cycles. The elevated potential in the output circuit 3–156o of the carry trigger 3–156 is applied to a gate 6–66 to which is also applied the elevated potential developed in the output circuits 6–55o of the add-subtract delay trigger 6–55. The latter is turned off by a negative potential pulse translated through the cathode follower 1–33 when the binary 16 unit of the primary counter turns off at the end of the carry cycles.

In turning off, the trigger 6–55 turns the test trigger 6–22 on, and the latter is turned off at the end of the next clock pulse by a negative potential pulse translated through the cathode follower 1–28. Thus the test trigger 6–22 completes a cycle of operation to develop a test pulse which is translated through the cathode follower 6–23 and inverter 6–24 and is further translated through the AND gate 5–72 (the tertiary trigger 5–52 being on at this time as explained above) to the quotient register counter 5–34 which is initially reset at the outset of a divide operation to store a zero as are also the quotient triggers 5–27–5–33. It will accordingly be seen that an initial successful reduction causes a one to be inserted in the higher order quotient register counter 5–34, and successive ones are likewise inserted in this counter for each successive reduction operation. Successive reduction operations are initiated at the time the product accumulator carry trigger 3–156 turns off at the end of the primary carry cycles, the elevated potential in its output circuit 3–156o being applied through the gate 6–45 and 6–46 to turn on the add-subtract control trigger 6–39 which thereupon initiates and controls the next reduction operation in the manner above described.

If the product accumulator carry trigger 3–156 is not turned on by the reduction operation to indicate that the reduction was a successful one as above assumed, or when it eventually fails to turn on at the time an overdraw occurs after several reduction operations, the lowered potential in its output circuit 3–156o prevents the AND gate 6–66 from opening so that the test trigger 6–22 does not turn on to generate a test pulse. At the same time, the elevated potential in the output circuit 3–156o' of the carry trigger 3–156 is applied to an AND gate 6–56 to which is also supplied the elevated potential developed in the output circuit 6–55o of the add-subtract delay trigger 6–55 earlier turned on by a clock pulse translated through the amplifier 6–54. Now when the latter trigger turns off, at the end of the second or fourth primary counter cycle, it turns on a sign trigger 6–57 through the gate 6–56. Also since this cycle of operation starts with the add-subtract control trigger 6–39 off (the off condition of the carry trigger 3–156 failing to turn it on as occurs for a successful reduction) the following cycle of operation is one in which the amount of reduction effected by the last reduction operation is now added back into the dividend (the off state of the trigger 6–39 operating through units 6–38, 6–36, 6–41, 2–47 and 2–49 to cause the stored divisor to be inserted through the column-shift matrix for addition into the product accumulator).

This add operation inherently causes the carry trigger 3–156 to turn on, and the elevated potential in its output circuit 3–156o is now applied to an AND gate 6–58 to which is also applied at this time the elevated potential in the output circuit 6–55o' of the add-subtract delay trigger 6–55 which is not turned on during the add cycle since 10's pulses are not translated at this time by the amplifier 6–54. Thus when the carry trigger 3–156 turns off at the end of the primary carry cycle, it turns the sign trigger 6–57 off to generate a positive potential pulse in the output circuit 6–57o' of the latter. This potential pulse is translated through a differentiating type of cathode follower 6–60, which accordingly develops a positive potential pulse of short duration, the inverter 6–44 and the OR units 5–36–5–43 of the quotient register to turn off whichever one of the tertiary counter triggers 5–45–5–52 is on at this time. This tertiary trigger in turning off turns on the next lower-order tertiary trigger as in the multiplication operation described above, and succeeding reductions of the divisor occur from the next lower orders of the dividend stored in the product accumulator. As before, each such successful reduction causes a one to be entered into the quotient register counters 5–27–5–34 corresponding to the order of the reduction until the next overdraw occurs, which is thereupon followed by an add cycle and shift to the next lower order cycle or cycles of reduction operation.

Eventually a final overdraw will occur at a time when the tertiary trigger 5–45 is on. The succeeding add operation turns the tertiary trigger 5–45 off, and in going off it turns the calculator trigger 6–13 off with it to complete the division operation.

The first pulse translated through the inverter 6–44 to advance the tertiary triggers 5–45–5–52 also turns off the incomplete division trigger 6–49, which was turned on when the calculate trigger 6–13 turned on to initiate the division operation. This trigger through its output circuit 6–49o is used merely to suppress read-out of the calculating machine if at the end of a calculate operation the trigger has not been turned off by at least one successful reduction. In this, note that at least one successful reduction is required by which to operate the sign trigger 6–57 through a cycle of operation and thereby develop a potential pulse in the output circuit of the inverter 6–44.

If for any reason the sign trigger 6–57 should remain on at the time of read-out from the calculating machine, the output circuit 6–57o of this trigger controls an "inversion" relay in a relay storage system presently to be described. The inversion relay operates to complement the number stored in the product accumulator as this number is read-out of the latter.

The quotient stored in the quotient register counters 5–27–5–34 at read-out time is read-out from the respective output circuits 5–27o–5–34o of the latter.

*Relay storage system*

Figure 8:
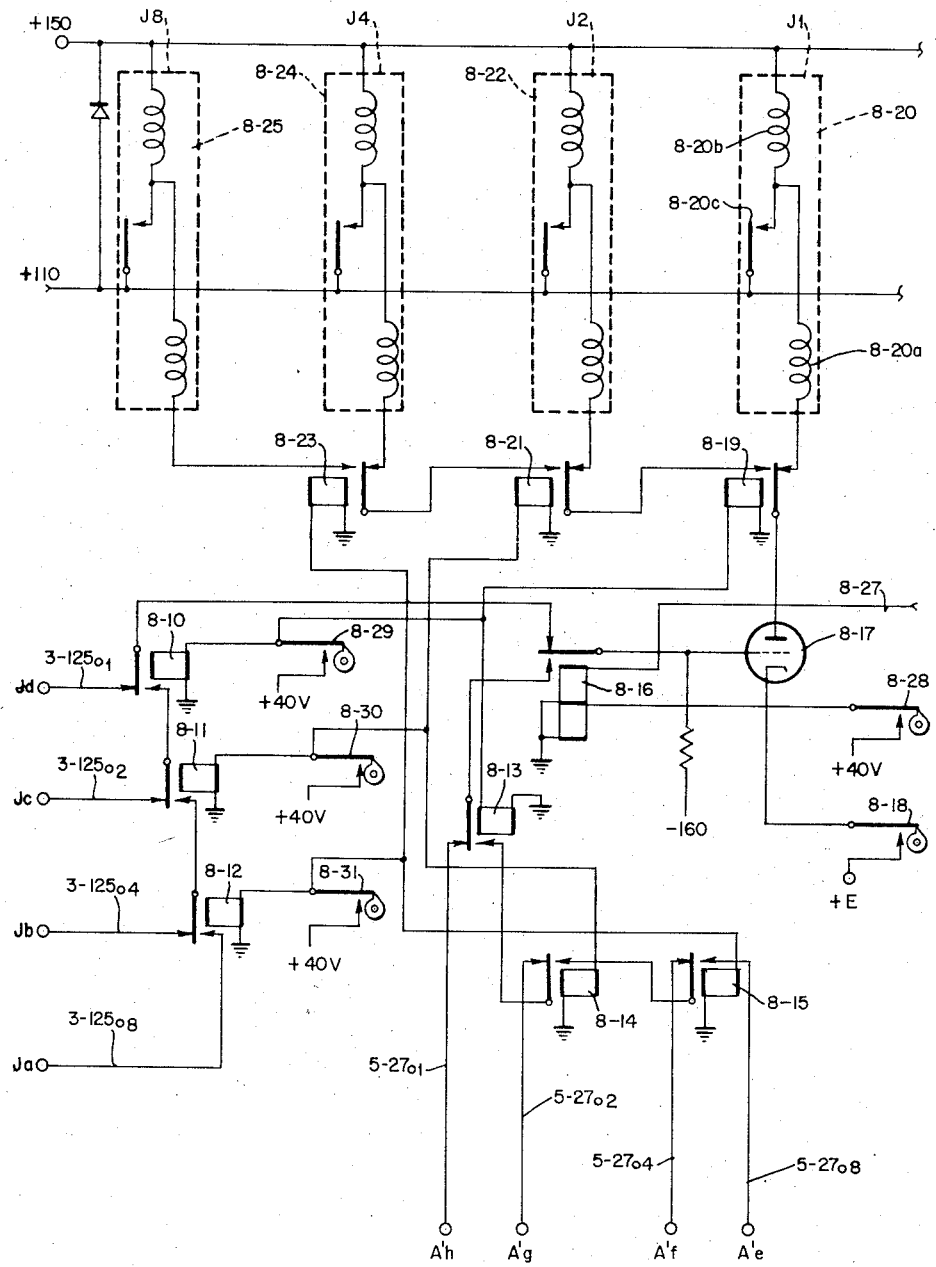
Figs. 8 and 9 are circuit diagrams which together show a data-output storage relay system used in the computer.

The results of calculation are temporarily stored in a relay system. One unit of this relay system has the circuit arrangement shown in Fig. 8. It will be appreciated that there is one such unit for each of the counters 3–125–3–140 of the product accumulator, and eight of the same units also serve for storage of the quotient read-out from the quotient register triggers 5–27–5–34. Each of the product accumulator and quotient register counters is indicated as having an output circuit (3–125o–3–140o for the product accumulator counters and 5–27o–5–34o for the quotient counters). Actually, there is one output circuit for each of the binary 1, 2, 4 and 8 triggers of each such counter. These several counter circuits are indicated in Fig. 8 as comprised, for example, by the output circuits 3–125$o_1$, 3–125$o_2$, 3–125$o_4$ and 3–125$o_8$ for the product accumulator counter 3–125. In similar manner the output circuits of the quotient counter 5–27 are identified, for example, in Fig. 8 as comprised by the output circuits 5–27$o_1$, 5–27$o_2$, 5–27$o_4$ and 5–27$o_8$. The output circuits 3–127$o_1$–3–125$o_8$ terminate in contacts of a plurality of relays 8–10, 8–11 and 8–12 as shown. Similarly, the output circuits 5–27$o_1$–5–27$o_8$ terminate at the contacts of a plurality of quotient read-out relays 8–13, 8–14 and 8–15 as shown. A relay 8–16 selectively couples the control electrode of a vacuum tube 8–17 to the output of relay 8–10 to read-out from the product accumulator or to the output of the relay 8–13 to read-out of the quotient register. The cathode circuit of vacuum tube 8–17 is completed to ground through CB contacts 8–18 during the read-out interval. The anode of the tube 8–16 is connected to the movable contact of a relay 8–19 which has one fixed contact connected as shown to the pick-up winding 8–20a of a storage relay 8–20 which includes a hold winding 8–20b energized through hold contacts 8–20c and CB contacts (not shown) which make throughout the subsequent card cycle until "9" time. The relay 8–19 has a second fixed contact connected to the movable contact of a relay 8–21 having a fixed contact connected to a relay 8–22 as indicated and a second fixed contact connected to the movable contact of a relay 8–23. The latter also has fixed contacts connected to storage relays 8–24 and 8–25 as shown.

If it is desired to read-out of the product accumulator counters, the relay 8–16 remains deenergized. For read-out of the quotient register counters, the relay 8–16 is picked up through an energizing circuit 8–27 which is energized during a divide operation as by energization through the multiply-divide relay of Fig. 6 at the time this relay moves to the divide position. Once the relay 8–16 has been picked up, it is held energized by a hold winding energized through a CB 8–28 which forms a component of the associated business machine and closes its contacts before the end of the calculate interval.

When the CB 8–18 closes at the outset of the read-out interval, the value of the potential E to which the cathode of this tube is biased is such that the vacuum tube 8–17 is normally nonconductive but is rendered conductive by the on condition of a binary trigger of a storage counter. Thus at the time the CB 8–18 closes, the binary 1 trigger of a product accumulator or the binary 1 trigger of a quotient counter causes the vacuum tube 8–17 to be conductive if the counter stores a one and this in turn causes the storage relay 8–20 to pick up and hold. Shortly after the outset of the read-out interval (and continuing through this interval), a CB 8–29 energizes the relays 8–10, 8–13 and 8–19 to read-out the binary 2 trigger of a counter and if such counter is on to store a 2 the storage relay 8–22 is caused to pick up and hold. Subsequent to closure of the CB 8–29, a CB 8–30 closes its contacts for the read-out interval and thereupon energizes relays 8–11, 8–14 and 8–21 to store a binary 4 in the storage relay 8–24. After closure of the CB 8–30, a CB 8–31 closes its contacts for the read-out interval and binary 8 is stored in the storage relay 8–25. Thus the number stored in the product accumulator at the end of the calculate interval, or the number stored in the quotient register, is transferred to storage in the storage relays 8–20–8–25.

Figure 9:
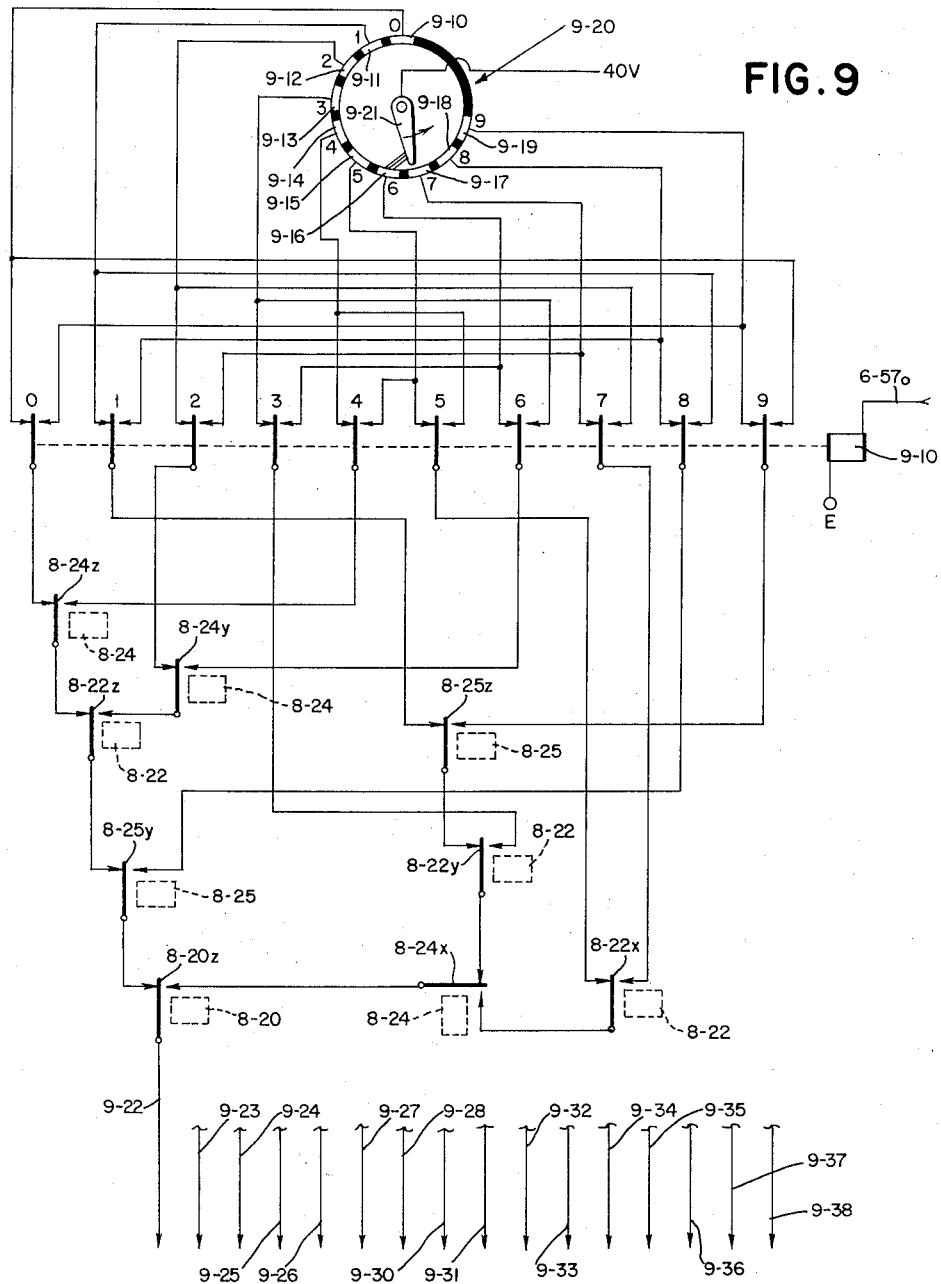

The storage relays 8–20–8–25 each include movable and fixed contacts which are connected in the manner shown in Fig. 9 to provide totalization of the binary number stored in the storage relay system. The results of totalization effects energization, at the card row time corresponding to such totalized number of a punch magnet of the associated business machine by which to record into a card passing by the punch station the results of calculation. As shown in Fig. 9, the relay 8–20 includes contacts 8–20z; the relay 8–22 includes contacts 8–22x, 8–22y, and 8–22z; the relay 8–24 includes relay contacts 8–24x, 8–24y, and 8–24z; and the relay 8–25 includes relay contacts 8–25y and 8–25z. The fixed contacts of the relays last mentioned are connected as shown through the normally closed contacts of an inversion relay 9–10 to individual ones of a plurality of fixed distributor contacts 9–11–9–19 of a distributor 9–20 having a driven contactor 9–21 which periodically scans the distributor fixed contacts 9–11–9–19. The distributor applies a potential, indicated as +40 volts, through the contacts 9–11–9–19 and through the normally closed or actuated contacts of the relay 9–10 and the relays 8–20, 8–22, 8–24 and 8–25 to a punch energizing circuit 8–22 to energize the punch magnet of the associated business machine. In this, the contacts of the relays last mentioned totalize the numbers stored in the storage relays of Fig. 8 and thus cause energization of the punch magnet circuit 9–22 at a particular card row time depending upon the value of the number so totalized. The distributor 9–20 engages successive ones of its contacts at card row times. Thus, for example, if none of the storage relays of Fig. 8 are energized during the read-out interval, the brush 9–21 of the distributor engages the distributor contact 9–11 at 0 card row time and translates energizing potential through the normally closed contacts of the relay 9–10, the normally closed contacts 8–24z of the relay 8–24, the normally closed contacts 8–22z of the relay 8–22, the normally closed contacts 8–25y of the relay 8–25, and the normally closed contacts 8–20z of the relay 8–20 to the punch magnet energizing circuit 9–22. The latter energizes a punch magnet to punch a hole in the zero row of the card and at an index point position in that row identified with the storage relay and read-out system which, as pointed out above, is individual to one of the plurality of product accumulator counters 3–125–3–140 or to an individual one of the quotient register counters 5–27–5–34. In this regard, Fig. 9 shows a plurality of such additional punch magnet energizing circuits 9–23–9–38 which will be energized by storage relay and read-out systems corresponding to Figs. 8 and 9.

The relay 9–10 is energized by the output circuit 6–57o of the sign trigger 6–57 shown in Fig. 6, and its fixed contacts are connected as shown to effect recomplementing of the number stored in the product accumulator whenever the sign trigger 6–57 remains on at the end of the calculate interval indicating that the number stands in the product accumulator in complemented form.

*Trigger reset system*

Figure 10:
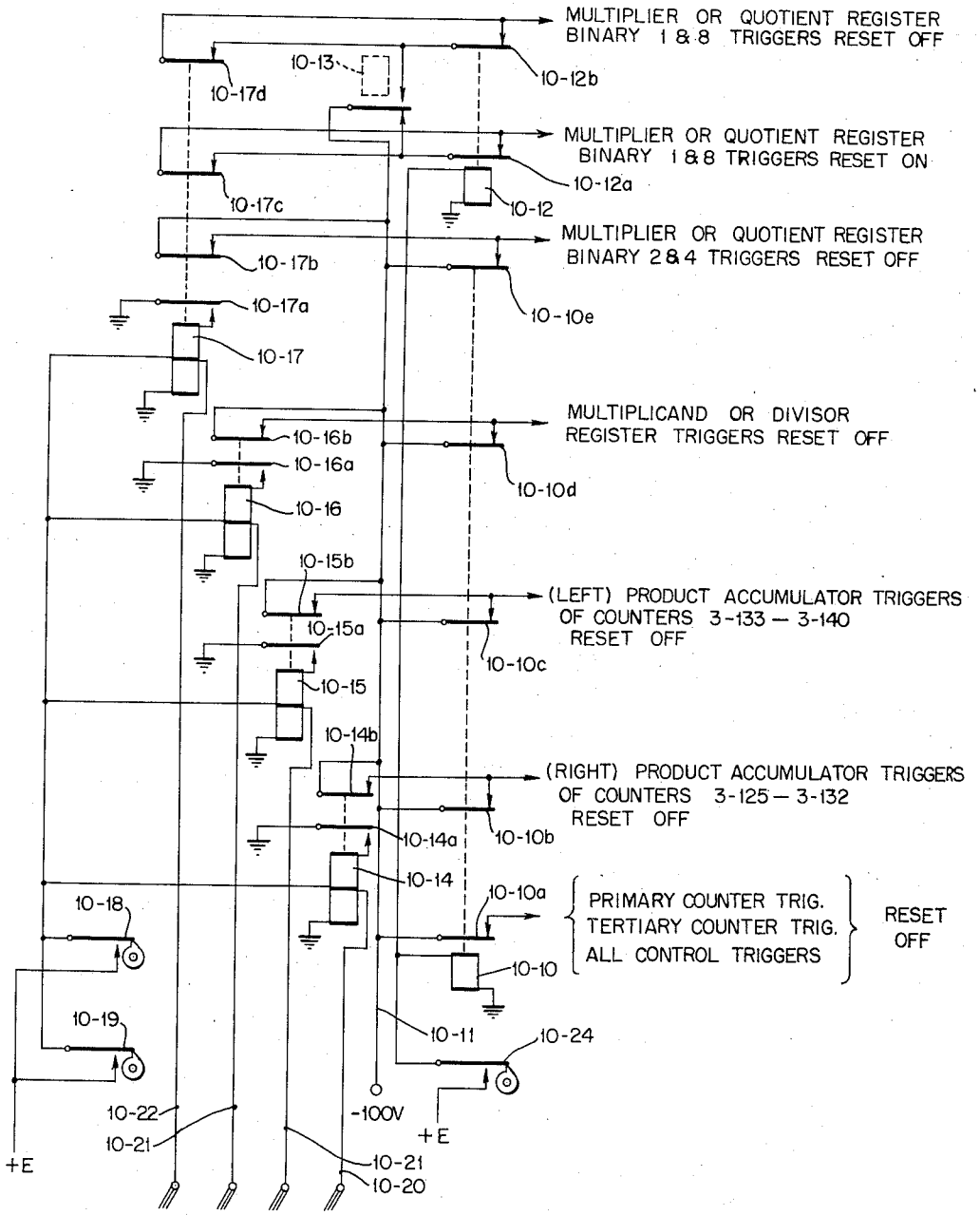
Fig. 10 is a circuit diagram showing a reset system employed in the computer.

The reset system for the triggers used in the present calculator is shown in Fig. 10 and the reset time relationships hereinafter described are indicated in Fig. 3c. The reset operation is accomplished by interrupting the circuit between the cathode and the negative terminal of the high voltage space-current supply source of a trigger tube, the particular tube so deenergized being selected in accordance with whether it is desired to reset a given trigger on or off.

Referring particularly to Fig. 10, a relay 10–10 has a plurality of normally closed contacts 10–10a–10–10e which normally complete the energizing circuits for certain trigger tubes to the negative terminal 10–11 of the high-voltage space-current source for these tubes. Specifically, the relay contacts 10–10a reset off all of the primary and tertiary counter triggers and reset off all control triggers. The relay contacts 10–10b reset off all triggers used in the counters of the product accumulator units 3–125–3–132. The relay contacts 10–10c reset off all triggers of the counters used in the product accumulator units 3–133–3–140. The relay contacts 10–10d reset off the triggers of the counters used in the multiplicand or divisor register units 4–27–4–34. The relay contacts 10–10e reset off the binary 2 and binary 4 triggers of the counters used in the multiplier or quotient register units 5–27–5–34. A relay 10–12 includes relay contacts 10–12a and 10–12b. The contacts 10–12a reset on the binary 1 and binary 8 triggers of the multiplier or quotient register units 5–27–5–34 if a multiply-divide relay 10–13 is deenergized for a multiplication operation. The relay contacts 10–12b reset off the binary 1 and binary 8 triggers of the multiplier or quotient register units 5–27–5–34 if the multiply-divide relay 10–13 is energized for a division operation. The multiply-divide relay 10–13 is energized concurrently with the multiply-divide relay of the Fig. 6 control system, and will be noted that the relay contacts 10–10e and 10–12a reset the multiplier or quotient register triggers to store a 9 (complemented zero) for multiplication whereas the contacts 10–10e and 10–12b reset these triggers to store a zero for division.

The reset relay system additionally includes relays 10–14–10–15, 10–16 and 10–17. Each of these relays includes normally open "a" contacts which are used to hold the relay energized through a CB 10–18 or 10–19 once the relay has been picked up by energization through a respective reading brush circuit 10–20–10–22. The relay 10–14 includes normally closed contacts 10–14b connected in parallel with the contacts 10–10b of the relay 10–10. The relay 10–15 likewise includes normally closed contacts 10–15b which are connected in parallel with the contacts 10–10c of the relay 10–10. The relay 10–16 includes normally closed contacts 10–16b connected in parallel with the contacts 10–10d of the relay 10–10. The relay 10–17 includes normally closed contacts 10–16b paralleling the contacts 10–10e, normally closed contacts 10–17c paralleling the contacts 10–12a, and normally closed contacts 10–17d paralleling the contacts 10–12b.

The relays 10–10 and 10–12 are energized through CB 10–24 which with the CBs 10–18 and 10–19 form components of the associated business machine and operate with certain time relationships now to be described. In considering the interrelated operations of the several relays shown in Fig. 10, it may be mentioned that it is the purpose of the relays 10–14–10–17 to establish the pattern or nature of the reset operation. To this end, the CB 10–18 closes its contacts at 14.9 card time and opens them at 11.7 card time to establish a holding circuit for any of the relays 10–14–10–17 which may be energized just prior to the reset interval. As indicated by the shaded areas of the CB 10–18 operation graphically shown in Fig. 3c, certain punched index points in the twelfth card row may be used selectively to energize the relays 10–14–10–17 through brush circuits 10–20–10–22 during the twelfth row time and thereby establish one selectable reset pattern. This pattern, for example, may consist of energizing only relays 10–15 and 10–16 to reset off the triggers of the product accumulator units 3–133–3–140 and the multiplicand or product units 4–27–4–34 but leaving the remaining trigger units not reset. The relays 10–14–10–17 may alternately be energized through brush circuits 10–20–10–22 by punched index points of the data-card in row 11 to establish a second reset pattern as also indicated in Fig. 3c. Once any of the relays 10–14–10–17 are so energized and pick up, they are held energized through their associated "a" contacts and the CB 10–18 until the CB 10–19 closes its contacts at 11.6 card time to maintain these relays energized throughout the ensuing card cycle and until just prior to the next reset operation. The relays 10–10 and 10–12 are energized through CB 10–24 which closes its contacts at 11.6 card time and opens them at 11.9 card time. It will be apparent that the relay contacts 10–10a cyclically reset off once each card cycle all of the primary and tertiary counter triggers and all control triggers. Its contacts 10–10b–10–10e, and the contacts of relay 10–12, will open up energizing circuits of such other triggers of the calculator as are not maintained energized by the deenergized condition of one or more of the relays 10–14–10–17. Thus it is possible, for example, to accumulate in the product accumulator units 3–125–3–132 or 3–133–3–140 (or in both sets of units) the results of computations on the data information of one card and combine with this result or use it in computation with the data information of one or more succeeding data-cards. By way of further example, a multiplicand or divisor stored in the multiplicand or divisor storage register may be retained for use in the computation of several successive data-cards. Similarly, a multiplier stored in the multiplier or quotient storage register may be retained for computations on the data information of successive data-cards or a quotient may be accumulated in this register from the processing of successive data-cards. Any of the foregoing results, or combinations of them, may be readily effected by selective energizations of the relays 10–14–10–27 during the eleventh and twelfth card row times to establish selectable patterns of reset operation.

It will be apparent from the foregoing description of the invention that a computer embodying the invention is of relatively simple and inexpensive construction utilizing a minimized number of components enabling ready installation and servicing by comparatively inexperienced field service personnel. The computer of the present invention has the further advantages of versatility and relatively high rates of computation enhanced through attaining a maximum interval for calculation by sensing and immediately passing over all but significant data information involved in a calculation. There is the further advantage with a computer embodying the invention that it permits certain computation programming to be accomplished in simple manner by data-card punching so that changes of programming may be effected from card to card as desired and results of program calculations on the data information of one card, or selected data thereof, may be carried over to be used with or accumulated with data information from one or more succeeding cards. The present computer accordingly enables substantially enhanced utility and scope of functions of many present day business machines when used in conjunction therewith.

What is claimed is:

1. In an electronic computer, a circuit for accumulating $n$ multi-order factors directly from a record, each order of a factor being represented by a designation at an index position on said record representative of its value, comprising means operative for sequentially sensing for the designations at each of the index positions of said record, means for generating a burst of pulses to $n$ times at each of said index positions, means sequentially operative one factor at a time for transmitting a number of generated pulses from a burst equal to the value of each sensed index position designation for that factor, multi-order accumulator means, means for applying each of the transmitted value pulses to its respective order in the accumulator, carry means connected to the accumulator means for storing value carry pulses produced by said accumulator, and means operative at each of said index positions for applying the stored value carry pulses to the accumulator after each of the $n$ times the value pulses are applied to the accumulator.

2. In an electronic computer, a circuit for accumulating two multi-order factors directly from a record, each order of a factor being represented by a designation at an index position on said record representative of its value, the positive or negative sign of each factor being represented by a designation at another index position on said record, comprising means for sensing said sign designations and then sequentially sensing for the designations at each of said other index positions, a positive-negative control means for each factor, means responsive to the sensing of the sign designation for each factor for setting its respective positive-negative control means to its positive or negative conditioning position, means for generating two bursts of pulses at each of said index positions, means under control of the position of the positive-negative means for the factor for transmitting a number of generated pulses from a burst equal to the value of the sensed index position designation for one position of the positive-negative means and for transmitting a number of generated pulses from a burst equal to the complement of the value of the sensed index position designation for the other position of the positive-negative control means, multi-order accumulator means, and means operative one factor at a time for applying each of the transmitted pulses for the values of one factor to their respective order in the accumulator for accumulation followed by the applying of the transmitted pulses for the values of the other of the two factors to their respective orders of the accumulator for accumulation prior to the sensing of the next sequential index positions.

3. In an electronic computer, a circuit for accumulating $n$ multi-order negative factors directly from a record, each order of a factor being represented by a designation at an index position on said record representative of its value, comprising means for sequentially sensing for the designations at each of the index positions of said record, means for generating a burst of pulses $n$ times at each of said index positions, means for transmitting a number of generated pulses from a burst equal to the complement of the value of the sensed index position designation, multi-order accumulator means, and means operative at each of said index positions for sequentially applying one factor at a time each of the transmitted pulses to its respective order in the accumulator for accumulation prior to the sensing of the next sequential index positions.

4. In an electronic computer, a circuit for accumulating $n$ multi-order factors directly from a record, each order of a factor being represented by a designation at an index position on said record representative of its value, the positive or negative sign of each factor being represented by a designation at another index position on said record, comprising means for sequentially sensing said sign designations and the designations at each of said other index positions, a positive-negative control means for each factor, means responsive to the sensing of the sign designation for each factor for setting its respective positive-negative control means to its positive or negative conditioning position, means for generating $n$ burst of pulses at each of said index positions, means under control of the position of the positive-negative means for the factor for transmitting a number of generated pulses from a burst equal to the value of the sensed index position designation for one position of the positive-negative means and for transmitting a number of generated pulses from a burst equal to the complement of the value of the sensed index position designation for the other position of the positive-negative control means, multi-order accumulator means, means for applying each of the transmitted value pulses to its respective order in the accumulator, carry means connected to the accumulator means for storing value carry pulses produced by said accumulator, and means operative at each of said index positions for applying the stored value carry pulses to the accumulator after each of the $n$ times the value pulses are applied to the accumulator.

5. In an electronic computer including therein a multi-order accumulator, a multi-order value multiplicand storage device, a multi-order value multiplier storage device, and multiplication performing means operating in successive multiplication steps for selectively transferring the multiplicand value to the accumulator and for shifting the multiplicand value being transferred to different orders of the accumulator under successively shifting control of the orders of the multiplier, each step producing repeated transfers for a number of times proportional to the value in the controlling order of the multiplier; the combination therewith of a cycling pulse means for producing a test pulse followed by read out pulses when operative in a full cycle, said pulse means producing only a test pulse when operative in a short cycle, means for conditioning the input of a selected order of the multiplier storage unit for the application of a test pulse, means for applying said test pulses to the input of a conditioned order of the multiplier, each test pulse causing the conditioned multiplier order to which it is applied to produce a carry when the multiplier order stores a zero representing value, means responsive to the carry and operative on the conditioning means for shifting the conditioning to the next order of the multiplier and for producing a short cycle of the pulse means by causing the pulse means to produce another test pulse at the start of a new cycle, and means cooperating with said cycling pulse means and said multiplicand storage device and operative whenever the read out pulses are produced for transferring the multiplicand value to the accumulator.

6. In an electronic computer including therein a multi-order accumulator, a multi-order value multiplicand storage device, a multi-order value multiplier storage device, and multiplication performing means operating in successive multiplication steps for selectively transferring the multiplicand value to the accumulator and for shifting the multiplicand value being transferred to different orders of the accumulator under successively shifting control of the orders of the multiplier, each step producing repeated transfers for a number of times proportional to the value in the controlling orders of the multiplier; the combination therewith of a series of bistable elements operative in cycles, said elements operative in a full cycle to produce a test pulse followed by read out pulses, means producing a short cycle of the cycling series by selectively skipping the elements which produce the read out pulses, said short cycle producing means starting a new cycle for producing a new test pulse, means for conditioning the input of a selected order of the multiplier storage unit for the application of test pulse, means for applying said test pulses to the input of a conditioned order of the multiplier, each test pulse causing the conditioned multiplier order to which it is applied to produce a carry when the multiplier order stores a zero representing value, means responsive to the carry for shifting the conditioning to the next order of the multiplier and for actuating the skipping means to skip the elements which produce the read out pulses, and means cooperating with said bistable elements and said multiplicand storage device and operative whenever the read out pulses are produced for transferring the multiplicand value to the accumulator.

7. In an electronic computer including therein a multi-order accumulator, a multi-order value multiplicand storage device, a multi-order value multiplier storage device, and multiplication performing means operating in successive multiplication steps for selectively transferring the multiplicand value to the accumulator and for shifting the multiplicand value being transferred to different orders of the accumulator under successively shifting control of the orders of the multiplier, each step producing repeated transfers for a number of times proportional to the value in the controlling order of the multiplier; the combination therewith of a cycling pulse means for producing a test pulse followed by read out pulses when operative in a full cycle, said pulse means producing only a test pulse when operative in a short cycle, means for conditioning the input of a selected order of the multiplier storage unit for the application of a test pulse, means for applying said test pulses to the input of a conditioned order of the multiplier, each test pulse causing the conditioned multiplier order to which it is applied to produce a carry when the multiplier order stores a zero representing value, a bistable element connected to the multiplier input conditioning means and connected to the output of each order of the multiplier only one of said bistable elements being operative for conditioning the column shift means for controlling the orders of the accumulator to which the multiplicand is transferred, said bistable element being responsive to the carry to shift its operative condition to the next order bistable element and thereby shift the conditioning to the next order of the multiplier, the shift of the operative condition to the next order bistable element producing a short cycle of the pulse means by causing the pulse means to produce another test pulse at the start of a new cycle, and means cooperating with said cycling pulse means and said multiplicand storage device and operative whenever the read out pulses are produced for transferring the multiplicand value to the accumulator.

8. In an electronic computer including therein a multi-order accumulator, a multi-order value multiplicand storage device, a multi-order value multiplier storage device for storing a multiplier in 9's complement form and multiplication performing means operating in successive multiplication steps for selectively transferring the multiplicand value to the accumulator and for shifting the multiplicand value being transferred to different orders of the accumulator under successively shifting control of the orders of the multiplier, each step producing repeated transfers for a number of times proportional to the value in the controlling orders of the multiplier; the combination therewith of a cycling pulse means for producing a test pulse followed by read out pulses when operative in a full cycle, said pulse means producing only a test pulse when operative in a short cycle, means for conditioning the input of a selected order of the multiplier storage unit for the application of a test pulse, means for applying said test pulses to the input of a conditioned order of the multiplier, each test pulse causing the conditioned multiplier order to produce a carry when the multiplier order stores a 9 as a zero representing value, means responsive to the carry for shifting the conditioning to the next order of the multiplier and for producing a short cycle of the pulse means by causing the pulse means to produce another test pulse at the start of a new cycle, and means cooperating with said cycling pulse means and said multiplicand storage device and operative whenever the read out pulses are produced for transferring the multiplicand value to the accumulator.

9. In an electronic computer including therein a multi-order accumulator, a multi-order value multiplicand storage device, a multi-order value multiplier storage device, and multiplication performing means operating in successive multiplication steps for selectively transferring the multiplicand value to the accumulator and for shifting the multiplicand value being transferred to different orders of the accumulator under successively shifting control of the orders of the multiplier, each step producing repeated transfers for a number of times proportional to the value in the controlling orders of the multiplier; the combination therewith of a cycling pulse means for producing a first pulse followed by read out pulses when operative in a full cycle, said pulse means producing only a first pulse when operative in a short cycle, a bistable device operative when in its first stable state for producing a full cycle of the pulse means, said bistable device operative when in its second stable state for providing a short cycle of the pulse means, said first pulse placing said bistable device in said second state thereby also producing a test pulse only if said first pulse occurs when the bistable device is in its first state, means for conditioning the input of a selected order of the multiplier storage unit for the application of a test pulse, means for applying said test pulses to the input of a conditioned order of the multiplier, each test pulse causing the conditioned multiplier order to which it is applied to produce a carry when the multiplier order stores a zero representing value, means responsive to the carry for shifting the conditioning to the next order of the multiplier, said carry being operative to place the bistable device to its first state so as to ready it for producing a test pulse at the start of a new cycle, and means cooperating with said cycling pulse means and said multiplicand storage device and operative whenever the read out pulses are produced for transferring the multiplicand value to the accumulator.

10. In an electronic computer including therein a multi-order accumulator, a multi-order value multiplicand storage device, a multi-order value multiplier storage device, and multiplication performing means operating in successive multiplication steps for selectively transferring the multiplicand value to the accumulator and for shifting the multiplicand value being transferred to different orders of the accumulator under successively shifting control of the orders of the multiplier, each step producing repeated transfer for a number of times proportional to the value in the controlling order of the multiplier; the combination therewith of a series of bistable elements operative in cycles, said elements operative in a full cycle to produce a test pulse followed by read out pulses, means producing a short cycle of the cycling series by selectively skipping the elements which produce the read out pulses, said short cycle producing means starting a new cycle for producing a new test pulse, means for conditioning the input of a selected order of the multiplier storage unit for the application of a test pulse, means for applying said test pulses to the input of a conditioned order of the multiplier, each test pulse causing the conditioned multiplier order to which it is applied to produce a carry when the multiplier order stores a zero representing value, a tertiary bistable element connected to the multiplier input conditioning means and connected to the output of each order of the multiplier, only one of said tertiary bistable elements being operative for conditioning the column shift means for controlling the orders of the accumulator to which the multiplicand is transferred, said tertiary bistable element being responsive to the carry to shift its operative condition to the next order tertiary bistable element and thereby shift the conditioning to the next order of the multiplier, the shift of the operative condition to the next order tertiary bistable element producing a short cycle of the pulse means by causing the pulse means to produce another test pulse at the start of a new cycle, and means cooperating with said bistable elements and said multiplicand storage device and operative whenever the read out pulses are produced for transferring the multiplicand value to the accumulator.

References Cited in the file of this patent

UNITED STATES PATENTS

| | | |
|---|---|---|
| 2,364,540 | Luhn | Dec. 5, 1944 |
| 2,442,428 | Mumma | June 1, 1948 |
| 2,604,262 | Phelps et al. | July 22, 1952 |
| 2,609,143 | Stibitz | Sept. 2, 1952 |
| 2,701,095 | Stibitz | Feb. 1, 1955 |
| 2,702,380 | Brustman et al. | Feb. 15, 1955 |
| 2,721,990 | McNaney | Oct. 25, 1955 |
| 2,737,342 | Nelson | Mar. 6, 1956 |
| 2,749,037 | Stibitz | June 5, 1956 |
| 2,750,113 | Coleman | June 12, 1956 |
| 2,767,908 | Thomas | Oct. 23, 1956 |
| 2,770,415 | Lindersmith | Nov. 13, 1956 |
| 2,829,827 | Bergfors | Apr. 8, 1958 |

OTHER REFERENCES

Bird: Computing Machines, Electronic Engineering, October 1953, pages 407 to 410.

UNITED STATES PATENT OFFICE
CERTIFICATION OF CORRECTION

Patent No. 2,966,304                          December 27, 1960

Leonard Roy Harper

It is hereby certified that error appears in the above numbered patent requiring correction and that the said Letters Patent should read as corrected below.

Column 27, line 8, strike out "to".

Signed and sealed this 8th day of August 1961.

(SEAL)
Attest:

ERNEST W. SWIDER
Attesting Officer

DAVID L. LADD
Commissioner of Patents